United States Patent
Li et al.

(10) Patent No.: US 12,191,697 B2
(45) Date of Patent: Jan. 7, 2025

(54) DISCHARGING CONTROL METHOD AND CHARGING CONTROL METHOD OF RECHARGEABLE BATTERY, AND RECHARGEABLE BATTERY

(71) Applicant: SENZHEN MAIGESONG ELECTRICAL TECHNOLOGY CO., LTD., Senzhen (CN)

(72) Inventors: Song Li, Senzhen (CN); Aiwen Deng, Senzhen (CN); Tihang Jin, Senzhen (CN)

(73) Assignee: Guangdong Miyear Mgxon Power System Co., Ltd., Dongguan (CN)

(*) Notice: Subject to any disclaimer, the term of this patent is extended or adjusted under 35 U.S.C. 154(b) by 520 days.

(21) Appl. No.: 17/634,797

(22) PCT Filed: Aug. 12, 2020

(86) PCT No.: PCT/CN2020/108651
§ 371 (c)(1),
(2) Date: Feb. 11, 2022

(87) PCT Pub. No.: WO2021/027838
PCT Pub. Date: Feb. 18, 2021

(65) Prior Publication Data
US 2022/0329097 A1    Oct. 13, 2022

(30) Foreign Application Priority Data
Aug. 12, 2019 (CN) .......................... 201910741671.6

(51) Int. Cl.
*H02J 7/00* (2006.01)
*H01M 10/04* (2006.01)
(Continued)

(52) U.S. Cl.
CPC ... *H02J 7/007182* (2020.01); *H01M 10/0422* (2013.01); *H01M 10/0525* (2013.01);
(Continued)

(58) Field of Classification Search
CPC .. H02J 7/007182; H02J 7/0049; H02J 7/0031; H02J 7/0036; H01M 10/0422;
(Continued)

(56) References Cited

U.S. PATENT DOCUMENTS

2016/0254574 A1* 9/2016 Li .......................... G01R 31/36
                                                         320/107
2020/0124678 A1* 4/2020 Kim .................... H01M 50/569

FOREIGN PATENT DOCUMENTS

CN    102299392 A    12/2011
CN    109935920 A    6/2019
(Continued)

*Primary Examiner* — Nathaniel R Pelton
(74) *Attorney, Agent, or Firm* — Rosenberg, Klein & Lee

(57) ABSTRACT

A discharging control method and a charging control method for a rechargeable battery, and the rechargeable battery. An electric system of the rechargeable battery comprises a lithium ion cell and a discharging control circuit, and a charging control circuit. A positive electrode of the lithium ion cell is electrically connected to a common ground end (GND) of the charging and/or discharging control circuit, so that the common ground end (GND) serves as a positive electrode (P) of the charging input and/or discharging output of the rechargeable battery; a negative electrode of the lithium ion cell is electrically connected to an output end of the charging control circuit and an input end of the discharging control circuit; and the input end of the charging control circuit and the output end of the discharging control circuit are electrically connected to a negative electrode (N) of the rechargeable battery.

20 Claims, 20 Drawing Sheets

(51) Int. Cl.
*H01M 10/0525* (2010.01)
*H01M 10/42* (2006.01)
*H01M 10/44* (2006.01)
*H01M 10/48* (2006.01)

(52) U.S. Cl.
CPC ......... *H01M 10/425* (2013.01); *H01M 10/44* (2013.01); *H01M 10/48* (2013.01); *H02J 7/0031* (2013.01); *H02J 7/0036* (2013.01); *H02J 7/0049* (2020.01); *H01M 2010/4271* (2013.01)

(58) Field of Classification Search
CPC ........... H01M 10/0525; H01M 10/425; H01M 10/44; H01M 10/48; H01M 2010/4271
USPC ....................................................... 320/134
See application file for complete search history.

(56) References Cited

FOREIGN PATENT DOCUMENTS

| | | |
|---|---|---|
| CN | 209119829 U | 7/2019 |
| JP | H08-65913 A | 3/1996 |

* cited by examiner

DISCHARGING CONTROL METHOD AND CHARGING CONTROL METHOD OF RECHARGEABLE BATTERY, AND RECHARGEABLE BATTERY

CROSS-REFERENCE TO RELATED APPLICATIONS

This application is a 371 of International Application No. PCT/CN2020/108651, filed Aug. 12, 2020, which is based upon and claims priority to Chinese Patent Application 2019107416716, filed Aug. 12, 2019, the entire contents of which are incorporated herein by reference.

TECHNICAL FIELD

The present application relates to the technical field of secondary batteries, and more particular to a discharging control method and a charging control method of a rechargeable battery, and the rechargeable battery.

BACKGROUND

GB/T 8897.2 (IEC 60086-2) standardized cylindrical primary batteries have been widely adopted in the field of handheld or portable electronic and electrical products. Due to some problems, such as unable to reuse, high battery usage costs and environmental pollution from discarded batteries of primary batteries, the consumer market has an increasing demand for secondary battery products that can replace the GB/T 8897.2 (IEC 60086-2) standardized primary batteries. In the field of rechargeable battery products that are compatible with GB/T 8897.2 (IEC 60086-2) standardized primary batteries, nickel-cadmium batteries, nickel-metal hydride batteries, nickel-zinc batteries and other products have been born successively, but these rechargeable battery products have technical problems in discharging voltage compatibility, memory effect, charging rate, abuse tolerance and cycle life, failing to satisfy the consumers.

The performances of rechargeable lithium-ion batteries in terms of specific energy, charging and discharging memory effect, charging rate and cycle life is significantly better than that of nickel-cadmium secondary batteries, nickel-metal hydride secondary batteries, nickel-zinc secondary batteries, etc. The lithium-ion rechargeable batteries have gradually replaced other secondary batteries in the fields such as electronic and electrical power supplies, energy storage power supplies and power supplies. However, the discharging voltage of the rechargeable lithium-ion battery is not compatible with a nominal voltage of the primary battery defined by the GB/T 8897.2 (IEC 60086-2) standard, and they are required to be charged and discharged under the control of the charging and discharging control management circuit.

Therefore, the traditional electronic-controlled type lithium-ion batteries with embedded charging and discharging control circuit compatible with GB/T8897.2 (IEC60086-2) standard basically include two parts, that is, a lithium-ion cell and a controller. The controller is provided with a discharging control circuit, which is mainly configured to control the discharging voltage of the lithium-ion cell, so that the discharging voltage of the electronic-controlled type lithium-ion battery is compatible with the nominal voltage of the primary battery defined by the GB/T 8897.2 (IEC 60086-2) standard. Some electronic-controlled type lithium-ion batteries also integrate the charging control circuit in the controller, so that each electronic-controlled type lithium-ion battery has an independent charging and discharging circuit.

However, the controllers of the traditional electronic-controlled type lithium-ion batteries all adopt a control method that a positive level is used to control charging and/or discharging, that is, a ground end of the charging and/or discharging control circuit is electrically connected to the negative electrode of the lithium-ion cell to form a common ground end of the rechargeable battery, and is adopted as a common negative electrode of the discharge output and/or charging input end of the electronic-controlled type lithium-ion batteries. Thus, the controllers of the traditional rechargeable battery are mostly arranged at the positive electrode end of the lithium-ion cell. Otherwise, it will lead to a complex structure of electronic-controlled type lithium-ion batteries, which reduces the mounting space of the lithium-ion cell, resulting in lower battery storage power and lower battery performance.

SUMMARY

There are provided a discharging control method and a charging control method of a rechargeable battery, and the rechargeable battery. The technical solution is as below:

According to a first aspect of embodiments of the present disclosure, the present application provides a discharging control method of a rechargeable battery (also called: electronic-controlled type lithium-ion battery), applied to an electrical system of the rechargeable battery, wherein the electrical system comprises a lithium-ion cell and a discharging control circuit, and the discharging control method comprises:

electrically connecting a positive electrode of the lithium-ion cell to a common ground end of the discharging control circuit, and taking the common ground end as a positive electrode of a discharging output of the rechargeable battery; and electrically connecting a negative electrode of the lithium-ion cell to an input end of the discharging control circuit, converting a negative-electrode discharging voltage of the lithium-ion cell to a set negative-electrode discharging voltage by the discharging control circuit, and discharging outward through an output electrode, wherein the output electrode is taken as a negative electrode of the discharging output of the rechargeable battery.

According to a second aspect of embodiments of the present disclosure, the present application further provides a charging control method of a rechargeable battery, applied to the rechargeable battery itself or an external electrical system independent of the rechargeable battery, wherein the electrical system comprises a charging control circuit, and the rechargeable battery comprises a lithium-ion cell, and the charging control method comprises:

electrically connecting a positive electrode of a charging input of the rechargeable battery to a common ground end of the charging control circuit, and taking the common ground end as the positive electrode of the charging input of the rechargeable battery; and electrically connecting a negative electrode of the charging input of the rechargeable battery to an input end of the charging control circuit, so that the charging control circuit controls an input voltage and/or an input current of a negative electrode of the rechargeable battery, and outputs the input voltage and/or the input current to the negative electrode of the lithium-ion cell, to charge the lithium-ion cell.

According to a third aspect of embodiments of the present disclosure the present application further provides a rechargeable battery, comprising: a lithium-ion cell and a controller arranged at one end of the lithium-ion cell where a negative electrode is located, wherein the controller comprises a circuit board, on which a discharging control circuit and an negative-electrode end cover are arranged;

wherein a common ground end of the discharging control circuit is electrically connected to a positive electrode of the lithium-ion cell;

wherein the negative-electrode end cover is welded on the circuit board, and is electrically connected to a discharging output end of the discharging control circuit by welding;

wherein the discharging control circuit is provided with a discharging input end, and the negative electrode of the lithium-ion cell is welded and electrically connected to the discharging input end; and wherein a positive electrode of the lithium-ion cell is taken as a positive electrode of the rechargeable battery, and the negative-electrode end cover is taken as a negative electrode of the rechargeable battery.

DETAILED DESCRIPTION

Figure 1:
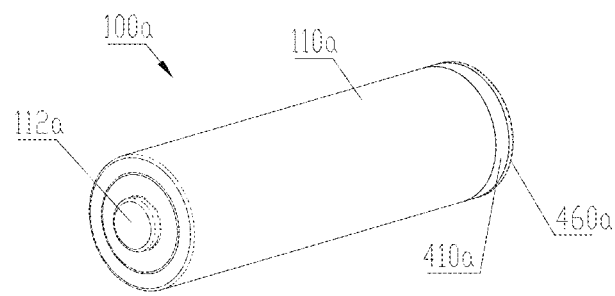
FIG. 1 is an outline schematic view of a positive electrode at one end of a rechargeable battery according to Embodiment 1.
Figure 2:
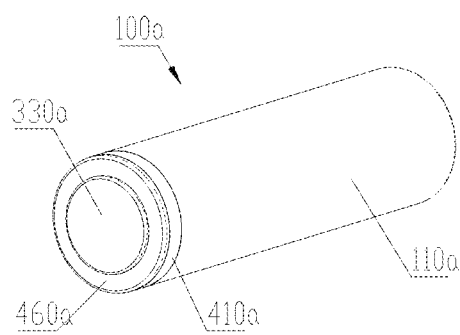
FIG. 2 is an outline schematic view of a negative electrode at the other end of the rechargeable battery according to Embodiment 1.
Figure 3:
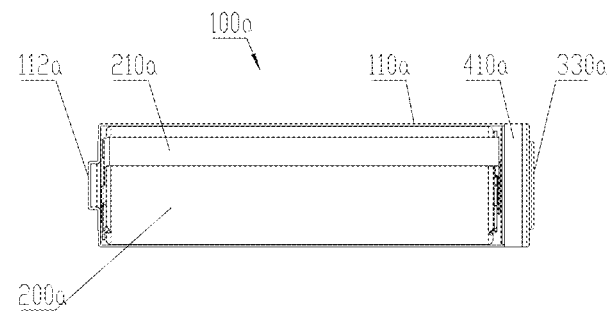
FIG. 3 is a schematic cross-sectional structural view of the rechargeable battery according to Embodiment 1.
Figure 4:
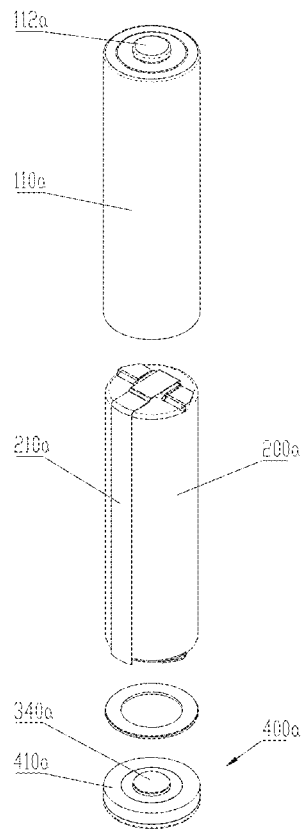
FIG. 4 is a schematic exploded view of the rechargeable battery according to Embodiment 1.
Figure 5:
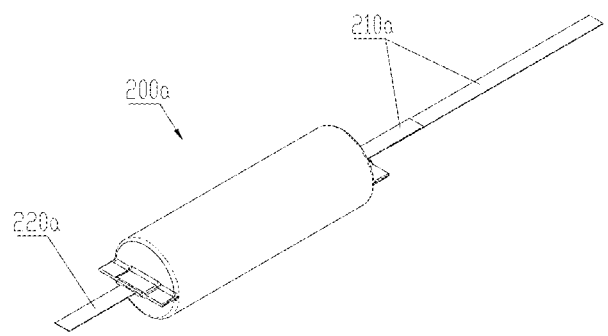
FIG. 5 is a schematic structural view showing that a positive electrode of a soft-packed lithium-ion cell of the rechargeable battery is welded to extend according to Embodiment 1.

Although the present application may be easily embodied in different forms of embodiment, only some of the specific embodiments are shown in the drawings and described in detail in this specification. Meanwhile, it may be understood that this specification should be regarded as exemplary illustrations of principles of the present disclosure, which is not intended to limit the present application to those described herein.

Thus, a feature described in this specification is used to describe one of the features of an embodiment of the present disclosure without implying that every embodiment of the present application is required to have the described feature. Furthermore, it should be noted that this specification describes a number of features. Although certain features may be combined together to illustrate possible system designs, these features may also be used in other combinations not explicitly stated. Therefore, unless otherwise stated, the combinations described are not intended to be limiting.

In the embodiments shown in the drawings, directional indications (such as up, down, left, right, front and rear) used to explain the structure and movement of the various components of the present application are relative rather than absolute. These descriptions are appropriate when the components are in the positions shown in the drawings. If the description of the position of these components changes, these directional indications change accordingly.

Exemplary embodiments are described more fully with reference to the accompanying drawings. However, these example embodiments may be embodied in various forms and should not be construed as limited to the examples set forth herein. Rather, these exemplary embodiments are provided for making this description of the present disclosure thorough and complete, and fully convey the concept of example embodiments to those skilled in the art. The drawings are merely schematic illustrations of the present disclosure and are not necessarily drawn to scale. The same reference numerals in the drawings denote the same or similar parts, and thus their repeated descriptions are omitted.

The preferred embodiments of the present application are further described below with reference to the accompanying drawings of the present description.

In this application, specific structural embodiments of four rechargeable batteries and a charging and discharging control method of one rechargeable battery are taken as examples, to describe an integrated structure of the rechargeable battery integrated system and the charging and discharging control method of the rechargeable battery.

Embodiment 1: Soft-Packed Lithium-Ion Battery (i.e., Rechargeable Battery of Soft-Packed Lithium-Ion Cell)

The rechargeable battery 100a consisted of soft-packed lithium-ion cells is taken as an example, to describe the structural features of the cell of the present disclosure. This embodiment is suitable for adopting soft-packed lithium-ion cells to form different types of rechargeable batteries, such as R6 batteries, R03 batteries, and CR17345 batteries.

Referring to FIGS. 1-8, the rechargeable battery 100a includes a soft-packed lithium-ion cell 200a and a controller 400a for controlling a charging and discharging.

Specifically, the rechargeable battery 100a includes a cylindrical battery outer shell 110a, a soft-packed lithium-ion cell 200a arranged in the battery outer shell 110a, a positive electrode cap provided at one end of the battery outer shell 110a and a controller 400a provided at the other end of the battery outer shell opposite to the positive electrode cap. The positive electrode cap is a closed-end boss 112a formed on one end of the battery outer shell 110a.

The soft-packed lithium-ion cell 200a may be filled with electrolyte, the surface of which is sealed with an insulating film. Two opposite ends of the soft-packed lithium-ion cell 200a are respectively provided with a positive electrode 210a and a negative electrode 220a exposed outside a cell package.

In this embodiment, a positive electrode of the soft-packed lithium-ion cell 200a is bent toward a negative electrode and extended to an open end of the battery outer shell 110a, and is welded to the battery outer shell 110a at the open end to establish an electrical connection. The purpose of extending the positive electrode of the soft-packed lithium-ion cell 200a is to facilitate welding and fixing the positive electrode of the soft-packed lithium-ion cell 200a to the battery outer shell 110a.

Figure 6:
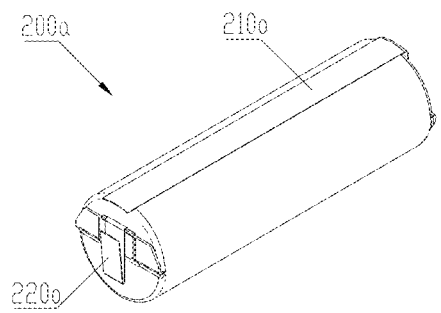
FIG. 6 is a schematic structural view showing that the positive electrode and the negative electrode of the soft-packed lithium-ion cell of the rechargeable battery are bent according to Embodiment 1.

As shown in FIG. 6, the positive electrode 210a is attached to the soft-packed lithium-ion cell 200a and is bent toward the negative electrode of the soft-packed lithium-ion cell 200a. The positive electrode 210a is capable of reaching one end of the soft-packed lithium-ion cell 200a where the negative electrode 220a is located after extending to be bent. The negative electrode 220a of the soft-packed lithium-ion cell 200a is bent toward a negative-electrode end surface of the soft-packed lithium-ion cell 200a. The positive electrode 210a includes an original part directly extended from the soft-packed lithium-ion cell 200a and an extension part. The extension part is made of metal sheet of the same material as the original part, and is welded to the original part by ultrasonic welding, resistance welding or laser welding.

It should be noted that, in other embodiments, the positive electrode of the soft-packed lithium-ion cell 200*a* may not be extended, and other connection methods are used to fix the positive electrode of the soft-packed lithium-ion cell 200*a* to the battery outer shell 110*a* or the positive electrode cap to establish an electrical connection, or other methods are used to lead the positive electrode of the soft-packed lithium-ion cell 200*a* to a common ground end of the charging and discharging control circuit of the controller 400*a*.

A specific structure of the controller 400*a* is shown in FIGS. 25-30.

Figure 29:
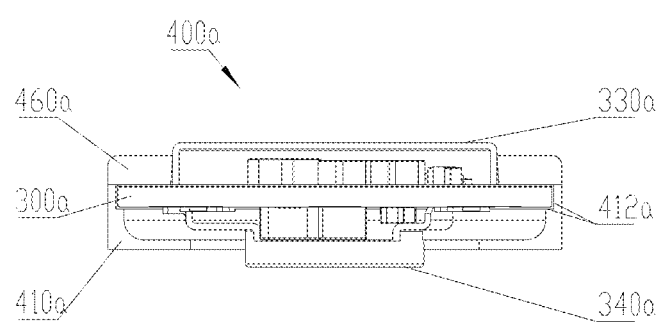
FIG. 29 is a schematic cross-sectional view of the controller of the rechargeable battery after assembly according to Embodiment 1.
Figure 30:
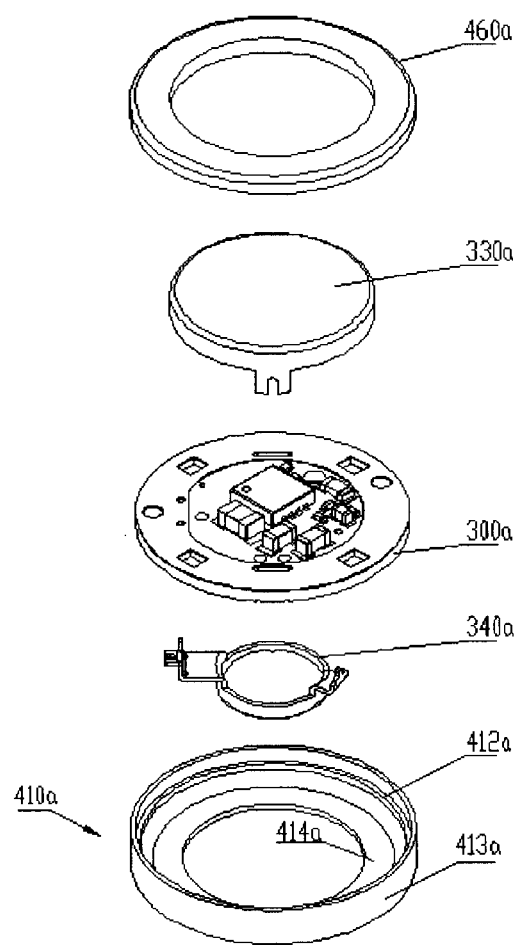
FIG. 30 is a schematic exploded view of the assembly of the controller of the rechargeable battery according to Embodiment 1.

Referring to FIGS. 29-30, an controller outer shell 410*a* is provided with on a periphery of the controller 400*a*. An inner electrode 340*a* is arranged at an end of the controller 400*a* in an axial direction, and a negative-electrode end cover 330*a* is arranged at the other end. A circuit board 300*a* is provided inside the controller 400*a*, and the inner electrode 340*a* is welded on a second surface of the circuit board 300*a* and is electrically connected to the circuit board 300*a*. The negative-electrode end cover 330*a* is welded on a first surface of the circuit board 300*a* and is electrically connected to the circuit board 300*a*.

Figure 25:
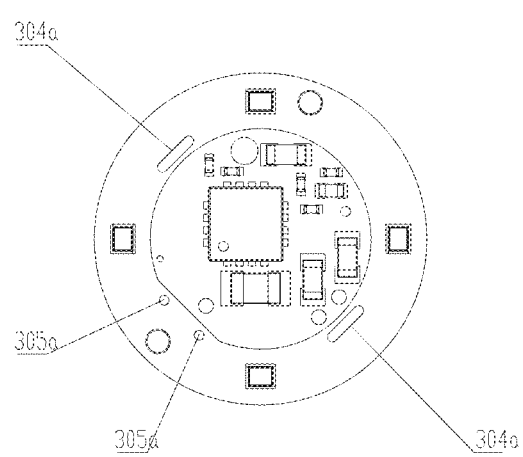
FIG. 25 is a schematic structural view of a first surface of a circuit board of the rechargeable battery according to Embodiment 1.
Figure 26:
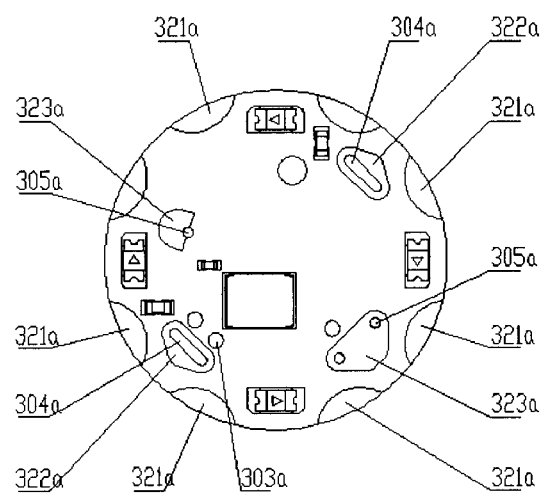
FIG. 26 is a schematic structural view of a second surface of the circuit board of the rechargeable battery according to Embodiment 1.

Referring to FIGS. 25-26, the circuit board 300*a* is provided with the first surface and the second surface opposite to each other. FIG. 25 shows the first surface of the circuit board 300*a*, and FIG. 26 shows the second surface of the circuit board 300*a*. As shown in FIGS. 25-26, the first surface and the second surface of the circuit board 300*a* are both welded with electronic components for constituting the charging and discharging control circuit. The second surface of the circuit board 300*a* is provided with first pads 321*a* (i.e., the controller outer-shell pads), second pads 322*a* (i.e., the negative-electrode end-cover pads) and third pads 323*a* (i.e., the inner-electrode pads). The first pads 321*a* are electrically connected to the common ground end of the charging and discharging control circuit and the positive electrode P of charging input and a discharging output of the charging and discharging control circuit. The second pads 322*a* are electrically connected to the negative electrode N of charging input and discharging output of the charging and discharging control circuit. The third pads 323*a* serve as access electrodes of the charging and discharging control circuit for connecting with the negative electrode 220*a* of the soft-packed lithium-ion cell 200*a*.

Figure 27:
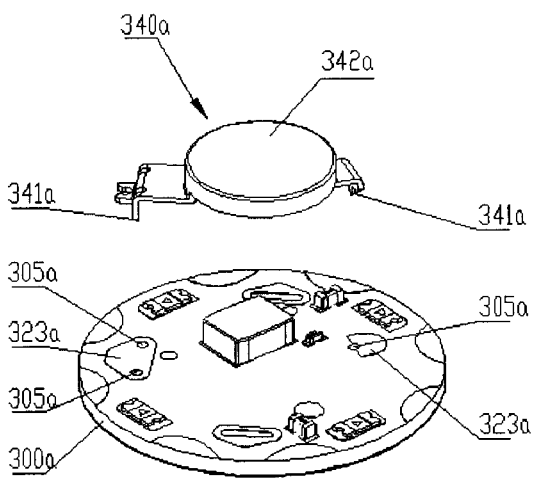
FIG. 27 is a schematic structural view showing that the inner electrode of the controller of the rechargeable battery is welded to the circuit board according to Embodiment 1.

As shown in FIGS. 26-27, the inner electrode 340*a* is provided on the second surface of the circuit board 300*a*, and the inner electrode 340*a* is electrically connected to the circuit board 300*a*. The inner electrode 340 includes an inner-electrode contact platform 342*a* parallel to the circuit board and inner-electrode welding positioning pins 341*a* connected to the inner-electrode contact platform 342*a*. The inner-electrode welding positioning pins 341*a* are fixed on the circuit board 300*a* and electrically connected to the circuit board 300*a*. Specifically, the circuit board 300*a* is provided with inner-electrode positioning holes 305*a* penetrating the first surface and the second surface. The second surface of the circuit board 300*a* is provided with the third pads 323*a* surrounding the inner-electrode positioning holes 305*a*. The inner electrode 340*a* is positioned by inserting the inner-electrode welding positioning pins 341*a* into the positioning holes 305*a* of the inner electrode, and the inner-electrode welding positioning pins 341*a* are welded to the circuit board 300*a* through the third pads 323*a* to establish an electrical connection.

Figure 28:
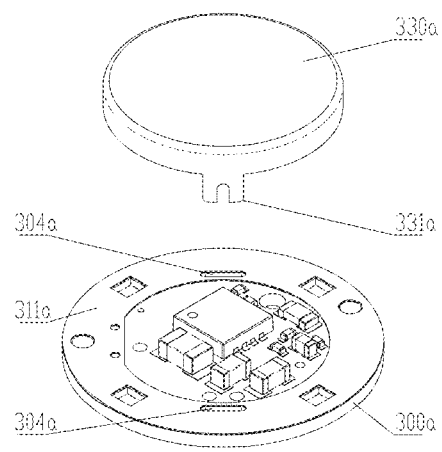
FIG. 28 is a schematic structural view showing that the negative-electrode end cover of the controller of the rechargeable battery is welded to the circuit board of the controller of the rechargeable battery according to Embodiment 1.

As shown in FIG. 25 and FIG. 28, the negative-electrode end cover 330*a* is made of metal conductive material, which is electrically connected to the circuit board 300*a* and arranged on the first surface of the circuit board 300*a*. The negative-electrode end cover 330*a* includes a circular hollow cap body with an open end, and negative-electrode end-cover welding positioning pins 331*a* formed by integrally extending from the cover body. The negative-electrode end-cover welding positioning pins 331*a* are fixed on the circuit board 300*a* and are electrically connected to the circuit board 300*a*. Specifically, the circuit board 300*a* is provided with positioning grooves 304*a* penetrating the first surface and the second surface. The second surface of the circuit board 300*a* is provided with the second pads 322*a* surrounding the positioning grooves 304*a*, and the negative-electrode end cover 330*a* is positioned by inserting the negative-electrode end-cover welding positioning pins 331*a* into the positioning grooves 304*a*, and the negative-electrode end-cover welding positioning pins 331*a* are welded to the circuit board 300*a* through the second pads 322*a* to establish an electrical connection.

As shown in FIG. 30, the controller outer shell 410*a* is provided with an inner cavity. The circuit board 300*a* is accommodated in the inner cavity, and the controller outer shell 410*a* is electrically connected to the circuit board 300*a*. The first surface of the circuit board 300*a* faces a top of the controller outer shell 410*a*, and the negative-electrode end cover 330*a* protrudes from a top opening of the controller outer shell 410*a*. The second surface of the circuit board 300*a* faces a bottom of the controller outer shell 410*a*, and the bottom of the controller outer shell 410*a* is provided with a through hole. The inner electrode 340*a* is exposed through the through hole, so as to electrically connect to the negative electrode 220*a* of the soft-packed lithium-ion cell 200*a*.

The controller outer shell 410*a* includes a cylindrical side wall 413*a* and a bottom wall 414*a* formed at an end of the side wall 413*a* in an axial direction and perpendicular to the side wall 413*a*. The circuit board 300*a* is arranged in and across the inner cavity enclosed by the side wall 413*a*. An inner surface of the side wall 413*a* is protrudingly provided with a limiting boss made of conductive metal material. The limiting boss is an annular platform protrudingly integrally formed on the inner surface of the side wall 413*a*. The annular platform is provided with an annular support plane protruding from the inner surface of the side wall 413*a* for supporting the circuit board, and the support plane and the side wall 413*a* form an annular inner positioning groove 412*a* with an L-shaped axial section. A center of the bottom wall 414*a* is provided with a through hole, through which the inner-electrode contact platform 342*a* 340*a* is exposed to the outside of the controller outer shell 410*a*, and there is a gap between an edge of the inner-electrode contact platform 342*a* and the edge of the through hole. The other end of the controller outer shell 410*a* opposite to the bottom wall 414*a* is a cylindrical open end.

As shown in FIGS. 26 and 30, a plurality of first pads 321*a* are provided around the edge of the circuit board 300*a*. When the circuit board 300*a* is arranged on the limiting boss, the first surface of the circuit board 300*a* is flush with the end surface of the open end of the controller outer shell 410*a*, and the second surface of the circuit board 300*a* is contacted and welded with the limiting boss 412*a* through the first pads 321*a*, thereby establishing an electrical connection with the controller outer shell 410*a*.

As shown in FIGS. 29-30, the controller 400*a* is further provided with a controller cover plate 460*a*, the controller cover plate 460*a* is arranged around a periphery of the negative-electrode end cover 330*a* and covers the first surface of the circuit board 300*a*. The controller cover plate 460a is made of insulating material, so as to insulate and protect the circuit components on the first surface of the circuit board 300a that are exposed outside the negative-electrode end cover 330a.

The first pads 321a of the circuit board 300a are electrically connected to the common ground end GND of the charging and discharging control circuit, and are electrically connected to the controller outer shell 410a by welding, so that the controller outer shell 410a is electrically connected to the common ground end GND of the charging and discharging control circuit.

The second pads 322a of the circuit board 300a are electrically connected to the negative electrode N of the charging input and discharging output of the charging and discharging control circuit, and the negative-electrode end cover 330a is welded to the second pads 322a of the circuit board 300a to establish an electrical connection, so that the negative-electrode end cover 330a serves as the negative electrode N of the charging input and discharging output of the charging and discharging control circuit.

The third pads 323a of the circuit board 300a serve as access electrodes of the charging and discharging control circuit for connecting with the negative electrode 220a of the soft-packed lithium-ion cell 200a, and the inner electrode 340a is welded to the third pads 323a of the circuit board 300a to establish an electrical connection, so that the inner electrode 340a serves as an access electrode of the charging and discharging control circuit for connecting with the negative electrode 220a of the soft-packed lithium-ion cell 200a.

Therefore, the negative-electrode end cover 330a, the inner electrode 340a, and the controller outer shell 410a constitute the three structural electrodes of the controller 400a.

Figure 7:
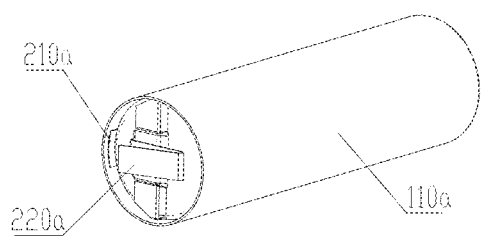
FIG. 7 is a schematic structural view showing that the soft-packed lithium-ion cell of the rechargeable battery is assembled in an outer shell of the rechargeable battery, and the positive electrode are welded to the outer shell of the rechargeable battery according to Embodiment 1.
Figure 8:
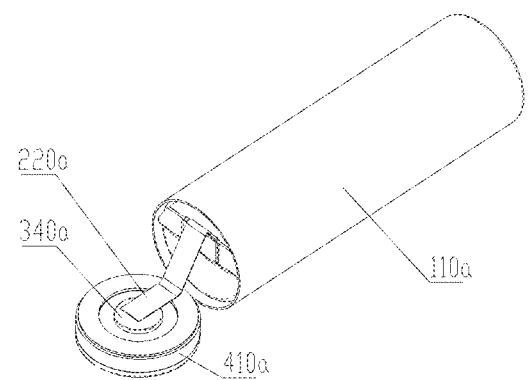
FIG. 8 is a schematic view showing that the negative electrode of the soft-packed lithium-ion cell of the rechargeable battery is welded to the inner electrode of the controller according to Embodiment 1.

FIGS. 7-8 are assembly views of the rechargeable battery 100a, FIG. 7 is an assembly view of the soft-packed lithium-ion cell 200a and the battery outer shell 110a, and FIG. 8 is an assembly view of the controller 400a, the soft-packed lithium-ion cell 200a and the battery outer shell 110a.

As shown in FIG. 7, after the soft-packed lithium-ion cell 200a is inserted into the battery outer shell 110a in the direction of the positive electrode 210a facing the closed end of the battery outer shell 110a, the positive electrode 210a is welded to the battery outer shell 110a, so that the battery outer shell 110a serves as a positive electrode for charging input and discharging output of the rechargeable battery.

As shown in FIG. 8, the controller 400a is arranged at the open end of the battery outer shell 110a, the controller outer shell 410a is welded to the battery outer shell 110a to establish an electrical connection, and the inner electrode 340a of the controller 400a is electrically connected to the negative electrode 220a of the soft-packed lithium-ion cell.

After the rechargeable battery 100a is welded, the inner electrode 340a serves as the access electrode for connecting the negative electrode of the soft-packed lithium-ion cell 200a with the controller 400a. The negative-electrode end cover 330a serves as the negative electrode of the charging input and discharging output of the rechargeable battery 100a. The battery outer shell 110a serves as the positive electrode of the charging input and discharging output of the rechargeable battery 100a and the common ground end of the charging and discharging control circuit.

Embodiment 2: Aluminum-Shell Lithium-Ion Battery

The embodiment of the rechargeable battery 100b comprised of aluminum-shell lithium-ion cells is taken as an example, to describe structural features of the aluminum-shell lithium-ion battery of the present disclosure. This embodiment is suitable for adopting aluminum-shell lithium-ion cells to form different types of rechargeable batteries, such as R6 battery, R03 battery and CR17345 battery.

Figure 9:
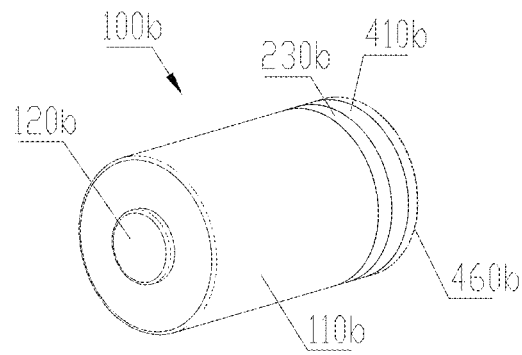
FIG. 9 is an outline schematic view of the positive electrode at one end of the rechargeable battery according to Embodiment 2.
Figure 10:
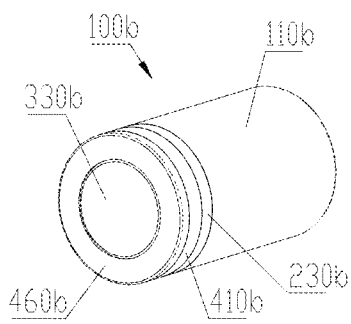
FIG. 10 is an outline schematic view of the negative electrode at the other end of the rechargeable battery according to Embodiment 2.
Figure 11:
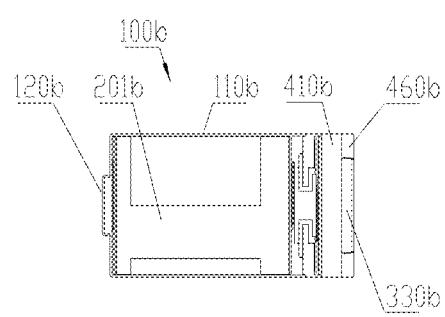
FIG. 11 is a schematic cross-sectional structural view of the rechargeable battery according to Embodiment 2.
Figure 12:
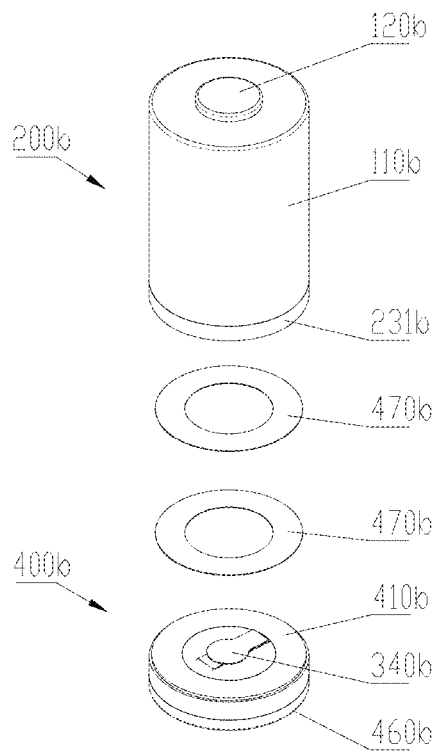
FIG. 12 is a schematic exploded view of the rechargeable battery according to Embodiment 2.

As shown in FIGS. 9-10, the rechargeable battery 100b is comprised of a controller 400b and an aluminum-shell lithium-ion cell 200b. An internal structure of the rechargeable battery 100b is shown in FIG. 11, and an assembly relationship of the rechargeable battery 100b is shown in FIG. 12.

Figure 13:
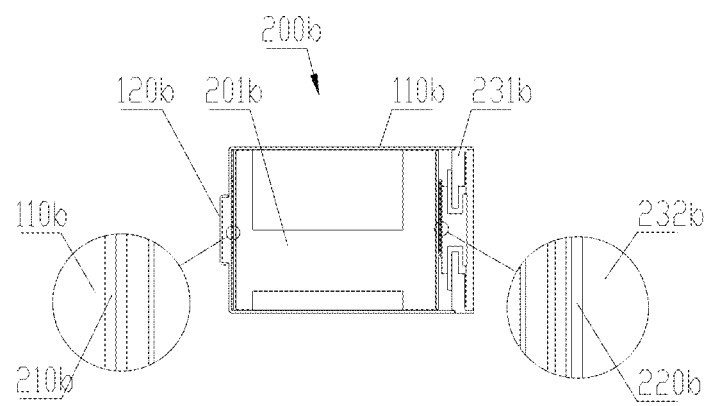
FIG. 13 is a schematic cross-sectional structural view of an aluminum-shell lithium-ion cell of the rechargeable battery according to Embodiment 2.
Figure 14:
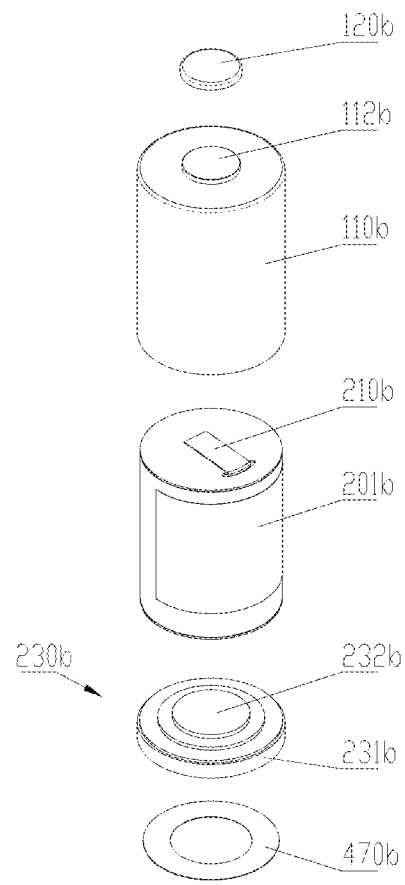
FIG. 14 is a schematic exploded view of the aluminum-shell lithium-ion cell of the rechargeable battery according to Embodiment 2.

Referring to FIGS. 13-14, the rechargeable battery 100b includes a cylindrical battery outer shell 110b, the aluminum-shell lithium-ion cell 200b arranged in the battery outer shell 110b, a positive electrode cap 120b connected to one end of the battery outer shell 110b and the controller 400b arranged at the other end of the battery outer shell opposite to the positive electrode cap 120b.

The battery outer shell 110b is made of aluminum material, and one end of the battery outer shell 110b forms a closed-end boss 112b, and the closed-end boss 112b is connected to the positive electrode cap 120b. The shape of the positive electrode cap 120b is adapted to the shape of the closed-end boss 112b, so that the positive electrode cap 120b can be sleeved on the closed-end boss 112b. The positive electrode cap 120b is assembled and fixed on the closed-end boss 112b of the battery outer shell 110b by means of interference fit and extrusion assembly, so that the positive electrode cap 120b is assembled and fixed on the battery outer shell 110b to establish an electrical connection. The positive electrode cap 120b serves as the positive electrode of the charging input and discharging output, and the negative-electrode end cover 330b of the controller 400b serves as the negative electrode of the charging input and discharging output.

Figure 15:
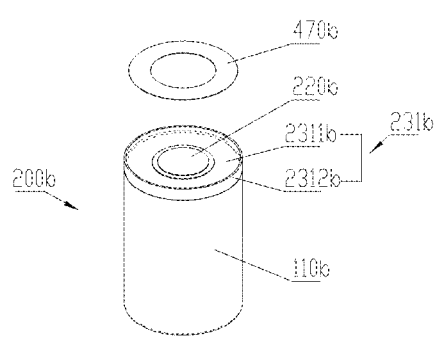
FIG. 15 is an exploded schematic view of the aluminum-shell lithium-ion cell and an insulating layer of the rechargeable battery according to Embodiment 2.

As showed in FIGS. 14-15, the aluminum-shell lithium-ion cell 200b includes a lithium-ion cell winding core 201b and a cell cap 230b, and the lithium-ion cell winding core 201b may be filled with electrolyte. The lithium-ion cell winding core 201b is welded on the battery outer shell 110b, and the battery outer shell 110b and the cell cap 230b are wrapped around the aluminum-shell lithium-ion cell winding core 201b, thereby forming the aluminum-shell lithium-ion cell 200b.

Two opposite ends of the lithium-ion cell winding core 201b are respectively provided with a positive electrode 210b and a negative electrode 220b exposed outside the cell package.

The cell cap 230b is arranged at an open end of the battery outer shell 110b and encloses the opening of the battery outer shell 110b. The cell cap 230b includes a circular cell cap shell 231b in the shape of a flat bottom cap and a lead-out electrode 232b made of conductive material riveted on the cell cap shell 231b.

The cell cap shell 231b includes a circular cap bottom 2311b and a cap edge 2312b surrounding the cap bottom 2311b in a circumferential direction. The lead-out electrode 232b is riveted on a center of the cap bottom 2311b and penetrates through the cap bottom 2311b. The battery outer shell 110b is made of aluminum, the cap bottom 2311b of the cell cap shell 231b is made of insulating material, and the cap edge 2312b is made of conductive material. The cap edge 2312b is connected to the battery outer shell 110b and the controller outer shell 410b of the controller 400b. A side of the lead-out electrode 232b exposed on the cell cap shell 231*b* is electrically connected to the negative electrode of the aluminum-shell lithium-ion cell winding core 201*b*.

The cell cap shell 231*b* is provided with a flange structure for assembling with the controller 400*b*, so that the controller 400*b* is sleeved with the cell cap 230*b* through the flange structure.

The cell cap 230*b* is arranged on the open end of the battery outer shell 110*b*, and the cell cap shell 231*b* and the battery outer shell 110*b* are welded together and are electrically connected. After the aluminum-shell lithium-ion cell 200*b* is welded and assembled, the cell cap shell 231*b* becomes part of the battery outer shell 110*b*, and the lead-out electrode 232*b* of the cell cap shell 231*b* becomes the negative electrode 220*b* of the aluminum-shell lithium-ion cell 200*b*.

A specific structure of the controller 400*b* is shown in FIGS. 31-35.

Figure 34:
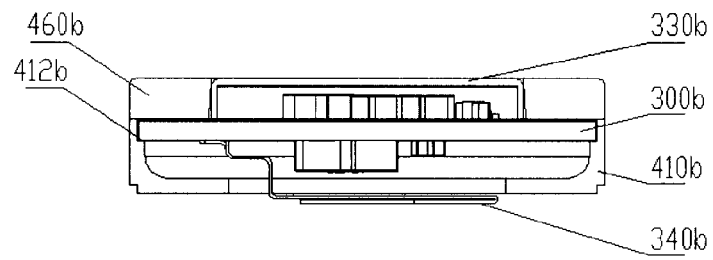
FIG. 34 is the cross-sectional view of the controller of the rechargeable battery after assembly according to Embodiment 2.
Figure 35:
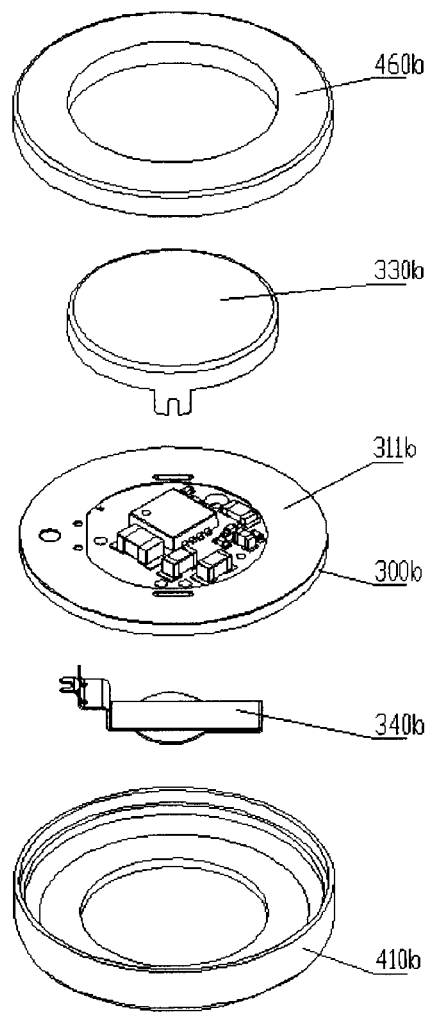
FIG. 35 is a schematic exploded view of the assembly of the controller of the rechargeable battery according to Embodiment 2.

Referring to FIGS. 34-35, the periphery of the controller 400*b* is provided with the controller outer shell 410*b*. The inner electrode 340*b* is arranged at one end of the controller 400*b* in an axial direction, and the negative-electrode end cover 330*b* is arranged at the other end. The controller 400*b* is provided with a circuit board 300*b*, and the inner electrode 340*b* is welded on the second surface of the circuit board 300*b* and is electrically connected to the circuit board 300*b*, and the negative-electrode end cover 330*b* is welded on the first surface of the circuit board 300*b* and is electrically connected to the circuit board 300*b*.

Figure 31:
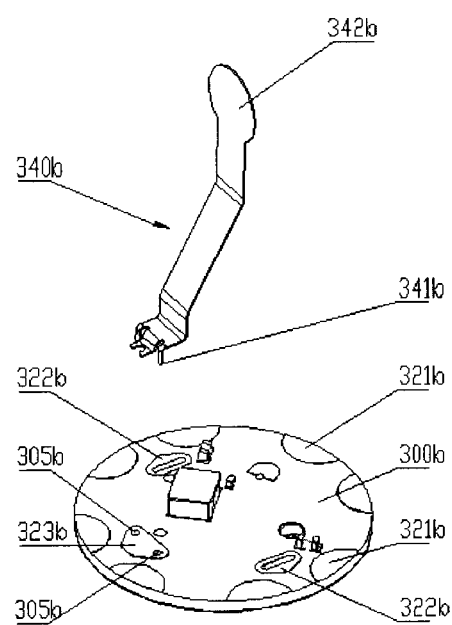
FIG. 31 is a schematic structural view showing that the inner electrode of the controller is welded to the circuit board of the rechargeable battery according to the embodiment 2.
Figure 32:
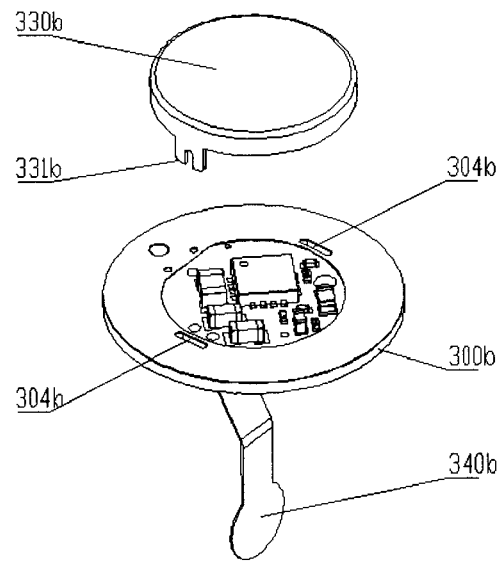
FIG. 32 is a schematic structural view showing that the negative-electrode end cover is welded to the circuit board of the controller of the rechargeable battery according to Embodiment 2.

As shown in FIGS. 31-32, the first surface and the second surface of the circuit board 300*b* are both welded with electronic components constituting the charging and discharging control circuit. The second surface of the circuit board 300*b* are provided with first pads 321*b* (i.e., the controller outer-shell pads), second pads 322*b* (i.e., the negative-electrode end-cover pads) and third pads 323*b* (i.e., the inner-electrode pads). The first pads 321*b* are electrically connected to the common ground end of the charging and discharging control circuit and the positive electrode P of the charging input and discharging output of the charging and discharging control circuit. The second pads 322*b* are electrically connected to the negative electrode N of the charging input and discharging output of the charging and discharging control circuit. The third pads 323*b* serve as access electrodes of the charging and discharging control circuit for connecting with the negative electrode 220*b* of the aluminum-shell lithium-ion cell 200*b*.

As shown in FIGS. 31-32, the inner electrode 340*b* is provided on the second surface of the circuit board 300*b*, and the inner electrode 340*b* is electrically connected to the circuit board 300*b*. The inner electrode 340*b* includes inner-electrode welding positioning pins 341*b* and a inner-electrode contact platform 342*b*, and the inner-electrode welding positioning pins 341*b* and the inner-electrode contact platform 342*b* form a strip structure. The inner-electrode contact platform 342*b* is integrally formed with the inner-electrode welding positioning pins 341*b*, and the inner-electrode contact platform 342*b* may be elastically bent relative to the inner-electrode welding positioning pins 341*b*.

The circuit board 300*b* is provided with inner-electrode positioning holes 305*b* penetrating the first surface and the second surface, and the second surface of the circuit board 300*b* is provided with the third pads 323*b* surrounding the inner-electrode positioning holes 305*b*. The inner-electrode welding positioning pins 341*b* are inserted into the inner-electrode positioning holes 305*b*, and are welded to the circuit board through the third pads 323*b* to establish an electrical connection.

Figure 33:
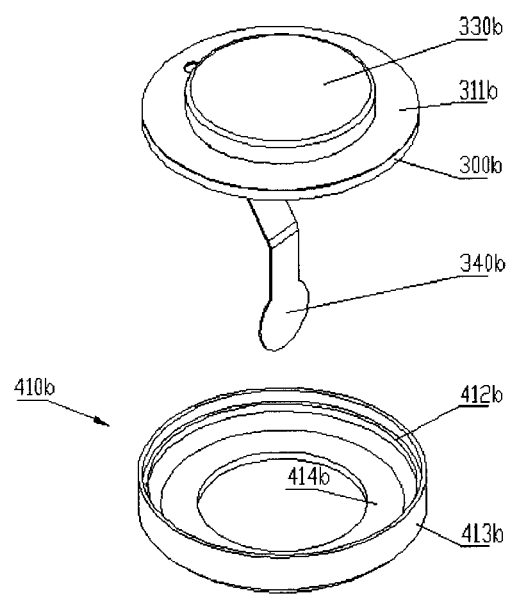
FIG. 33 is a schematic structural view showing that the controller outer shell is welded to the circuit board of the controller of the rechargeable battery according to Embodiment 2.

As shown in FIGS. 33-34, the inner electrode 340*b* is in the shape of a long strip. During an assembly process of the controller 400*b*, the inner electrode 340*b* is in an elongated state without folding. When the sealing package of the controller 400*b* is completed, the inner-electrode contact platform 342*b* of the inner electrode 340*b* is folded into a state parallel to the circuit board 300*b*, and an end of the inner-electrode contact platform 342*b* is suspended relative to the circuit board 300*b*.

As shown in FIGS. 32-33, the negative-electrode end cover 330*b* is made of metal conductive material, which is electrically connected to the circuit board 300*b* and arranged on the first surface of the circuit board 300*b*. The negative-electrode end cover 330*b* includes a circular hollow cap body with an end open and negative-electrode end-cover welding positioning pins 331*b* formed by integrally extending from the cap body. The negative-electrode end-cover welding positioning pins 331*b* are fixed on the circuit board 300*b* and are electrically connected to the circuit board 300*b*. Specifically, the circuit board 300*b* is provided with positioning grooves 304*b* penetrating the first surface and the second surface, and the second surface of the circuit board 300*b* is provided with second pads 322*b* surrounding the positioning grooves 304*b*. The negative-electrode end cover 330*b* is positioned by inserting the negative-electrode end-cover welding positioning pins 331*b* into the positioning grooves 304*b*, and the negative-electrode end-cover welding positioning pins 331*b* are welded on the circuit board 300*b* through the second pads 322*b* to establish an electrical connection, so that the negative-electrode end cover 330*b* is welded on the circuit board to establish an electrical connection.

As shown in FIGS. 33-35, the controller outer shell 410*b* includes a cylindrical side wall 413*b* and a bottom wall 414*b* perpendicular to the side wall 413*b* formed at an end of the side wall 413*b* in an axial direction, and the side wall 413*b* and the bottom wall 414*b* forms an inner cavity. A through hole is opened in a center of the bottom wall 414*b*, and the other end of the controller outer shell 410*b* opposite to the bottom wall 414*b* is a cylindrical open end. An inner surface of the side wall 413*b* is protrudingly provided with a limiting boss made of a conductive metal material. The limiting boss is an annular platform protrudingly formed on the inner surface of the side wall 413*b*, which is provided with an annular support plane supporting the circuit board, and the support plane and the side wall 413*b* form an annular inner positioning groove 412*b* with an axial L-shaped section.

The circuit board 300*b* is accommodated in the inner cavity of the controller outer shell 410*b*, and a periphery of the circuit board 300*b* is positioned by the inner positioning groove 412*b* and rested across the limiting boss of the controller outer shell 410*b*.

As shown in FIG. 31 and FIGS. 33-34, a plurality of first pads 321*b* are provided around the edge of the circuit board 300*b*. When the circuit board 300*b* is rested across the limiting boss, the first surface of the circuit board 300*b* is flush with an end surface of the open end of the controller outer shell 410*b*, and the second surface of the circuit board 300*b* are contacted and welded with the limiting boss 412*b* through the first pads 321*b*, thereby establishing an electrical connection with the controller outer shell 410*b*.

The first surface of the circuit board 300*b* faces the open end of the controller outer shell 410*b*, and the negative-electrode end cover 330*b* protrudes from a top opening of the controller outer shell 410*b*. The second surface of the circuit board 300*b* faces the bottom of the controller outer shell 410*b*, and the inner-electrode contact platform 342*b*

340b is exposed through the through hole in the center of the bottom wall 414b, so as to be electrically connected to the negative electrode 220b of the aluminum-shell lithium-ion cell 200b. There is a gap between the edge of the inner-electrode contact platform 342b and the edge of the through hole to ensure that the inner electrode 340b and the controller outer shell 410b are insulated from each other.

As shown in FIGS. 34-35, the controller 400b is further provided with a controller cover plate 460b. The controller cover plate 460b surrounds the periphery of the negative-electrode end cover 330b and covers the first surface of the circuit board 300b. The controller cover plate 460b is made of insulating material, so as to insulate and protect the circuit components on the first surface of the circuit board 300a that are exposed outside the negative-electrode end cover 330b.

The first pads 321b of the circuit board 300b are electrically connected to the common ground end GND of the charging and discharging control circuit, and are welded to the controller outer shell 410b to establish an electrical connection, so that the controller outer shell 410b is electrically connected to the common ground end GND of the charging and discharging control circuit.

The second pads 322b of the circuit board 300b are electrically connected to the negative electrode N of the charging input and discharging output of the charging and discharging control circuit, and the negative-electrode end cover 330b is welded to the second pads 322b of the circuit board 300b to establish an electrical connection, so that the negative-electrode end cover 330b serves as the negative electrode N of the charging input and discharging output of the charging and discharging control circuit.

The third pads 323b of the circuit board 300b serve as access electrodes of the charging and discharging control circuit for connecting with the negative electrode 220b of the aluminum-shell lithium-ion cell 200b, and the inner electrode 340b is welded to the third pads 323b of the circuit board 300b to establish an electrical connection, so that the inner electrode 340b serves as an access electrode of the charging and discharging control circuit for connecting with the negative electrode 220b of the aluminum-shell lithium-ion cell 200b.

Therefore, the negative-electrode end cover 330b, the inner electrode 340b, and the controller outer shell 410b constitute the three structural electrodes of the controller 400b.

Figure 17:
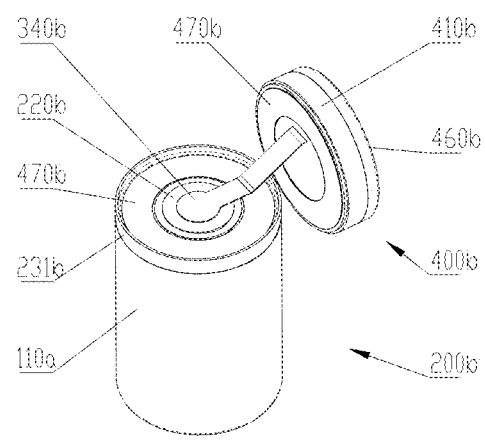
FIG. 17 is a schematic structural view showing that the inner electrode of the rechargeable battery is welded to the negative electrode of the aluminum-shell lithium-ion cell according to Embodiment 2.

FIG. 17 is an assembly view of the controller 400b and the aluminum-shell lithium-ion cell 200b.

As shown in FIG. 17, during assembling, the inner electrode 340b of the controller 400b is firstly welded to the negative electrode 220b of the aluminum-shell lithium-ion cell 200b, so that the inner electrode 340b is electrically connected to the negative electrode 220b of the aluminum-shell lithium-ion cell 200b. The open end of the cell cap shell 231b of the aluminum-shell lithium-ion cell 200b is coaxially butted with the controller outer shell 410b, and the two are welded to establish an electrical connection, so that the controller outer shell 410b is electrically connected to the battery outer shell 110b through the cell cap shell 231b.

Figure 16:
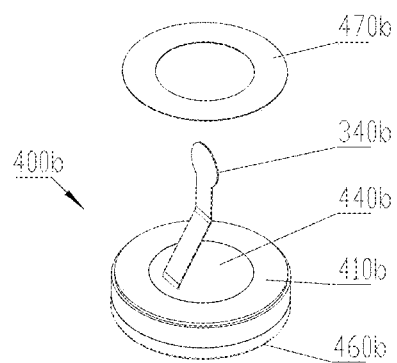
FIG. 16 is a schematic exploded view of the controller and the insulating layer of the rechargeable battery according to Embodiment 2.

As shown in FIGS. 15-17, an insulating layer 470b is provided on the surface of the cell cap shell 231b of the aluminum-shell lithium-ion cell 200b for establishing an electrical isolation between the cell cap shell 231b and the inner electrode 340b of the controller 400b. The side of the controller 400b facing the cell cap 230b is also provided with an insulating layer 470b for establishing an electrical insulation between the controller outer shell 410b and the inner electrode 340b of the controller 400b.

After the rechargeable battery 100b is welded and assembled, the inner electrode 340b serves as the access electrode for connecting the negative electrode of the aluminum-shell lithium-ion cell 200b with the controller 400b. The negative-electrode end cover 330b serves as the negative electrode of the charging input and discharging output of the rechargeable battery 100b. The battery outer shell 110b serves as the positive electrode of the charging input and discharging output of the rechargeable battery 100b and the common ground end of the charging and discharging control circuit.

Embodiment 3: Direct-Sealed Lithium-Ion Cell

Figure 18:
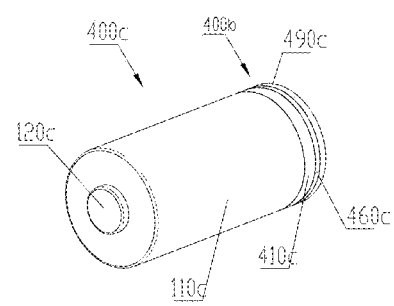
FIG. 18 is an outline schematic view of the positive electrode at one end of the rechargeable battery according to Embodiment 3.
Figure 19:
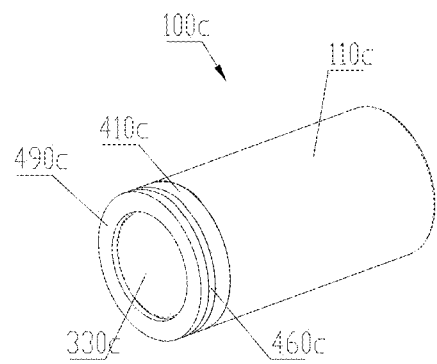
FIG. 19 is an outline schematic view of the negative electrode at the other end of the rechargeable battery according to Embodiment 3.
Figure 20:
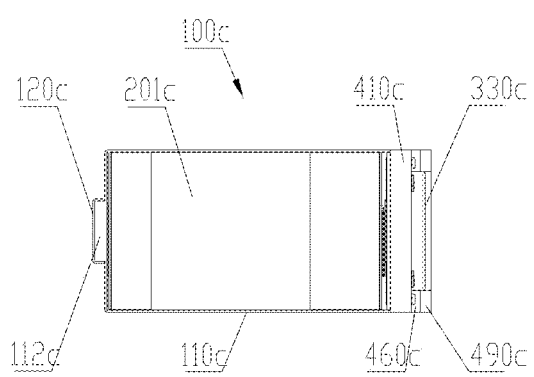
FIG. 20 is a schematic cross-sectional view of an internal structure of the rechargeable battery according to Embodiment 3.
Figure 21:
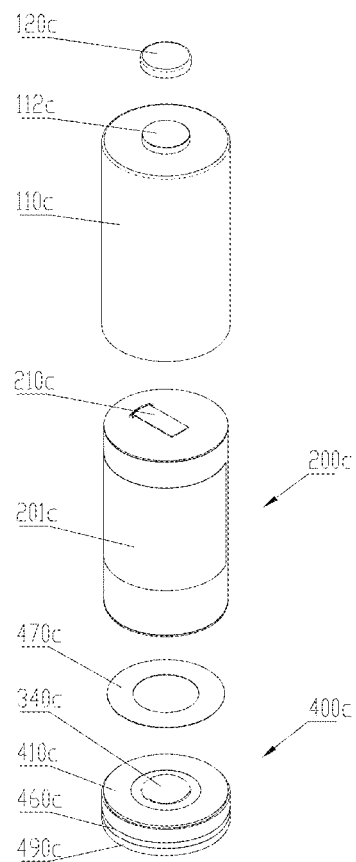
FIG. 21 is a schematic exploded view of the rechargeable battery according to Embodiment 3.

As shown in FIGS. 18-19, the rechargeable battery 100c adopts a direct-sealed lithium-ion cell 200c. An internal structure of the rechargeable battery 100c is shown in FIG. 20, and a structural assembly relationship of the rechargeable battery 100c is shown in FIGS. 21-22.

Figure 22:
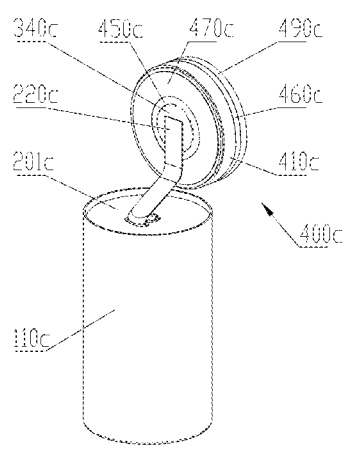
FIG. 22 is a schematic view showing that the negative electrode of a direct-sealed lithium-ion cell of the rechargeable battery is welded to the inner electrode of the controller according to Embodiment 3.

As shown in FIG. 18, FIG. 19 and FIG. 22, the rechargeable battery 100c includes a cylindrical battery outer shell 110c, a direct-sealed lithium-ion cell 200c arranged in the battery outer shell 110c, a positive electrode cap 120c arranged at one end of the battery outer shell 110c and a controller 400c arranged at the negative electrode end of the direct-sealed lithium-ion cell 200c.

The inside of the direct-sealed lithium-ion cell 200c may be filled with electrolyte, and the electrolyte is directly sealed by the battery outer shell 110c and the controller 400c.

The battery outer shell 110c may be made of aluminum material, and one end of the battery outer shell 110c forms a closed-end boss 112c, and the closed-end boss 112c is connected to the positive electrode cap 120c. The shape of the positive electrode cap 120c is adapted to the shape of the closed-end boss 112c, so that the positive electrode cap 120c can be sleeved on the closed-end boss 112c. The positive electrode cap 120c may be assembled and fixed on the closed-end boss 112c of the battery outer shell 110c by means of interference fit and extrusion assembly, to establish an electrical connection.

As shown in FIGS. 21-23, two opposite ends of the direct-sealed lithium-ion cell 200c are respectively provided with a positive electrode 210c and a negative electrode 220c. The controller 400c is arranged at an open end of the battery outer shell 110c and is electrically connected to the negative electrode of the direct-sealed lithium-ion cell 200c by welding, so that the controller 400c directly closes the open end of the battery outer shell 110c.

Specific structural views of the controller 400c are shown in FIGS. 36-40.

Figure 39:
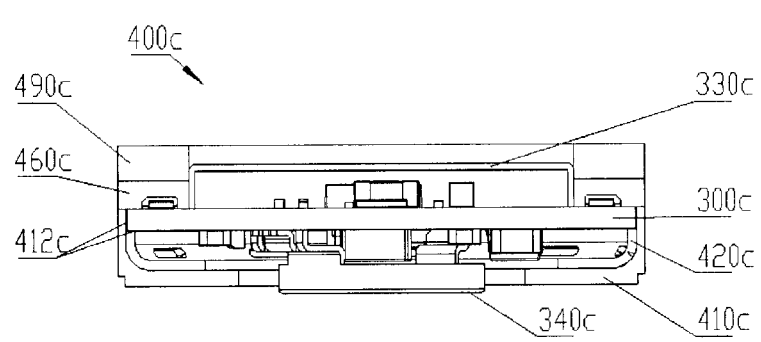
FIG. 39 is a schematic cross-sectional view of the controller of the rechargeable battery after welding according to Embodiment 3.
Figure 40:
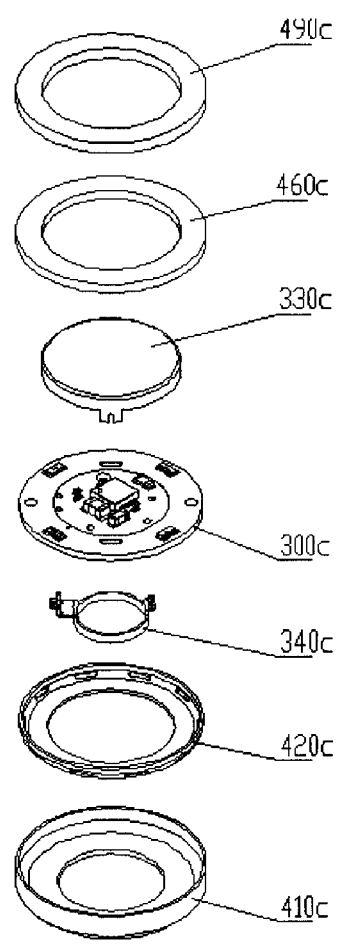
FIG. 40 is a schematic exploded view of the assembly of the controller of the rechargeable battery according to Embodiment 3.

As shown in FIGS. 39-40, a periphery of the controller 400c is provided with an controller outer shell assembly 410c. The controller 400c is provided with an inner electrode 340c at one end in the axial direction, and a negative-electrode end cover 330c at the other end. The controller 400c is provided with a circuit board 300c, and the inner electrode 340c is welded on the second surface of the circuit board 300c and is electrically connected to the circuit board 300c. The negative-electrode end cover 330c is welded on the first surface of the circuit board 300c and is electrically connected to the circuit board 300c.

Figure 36:
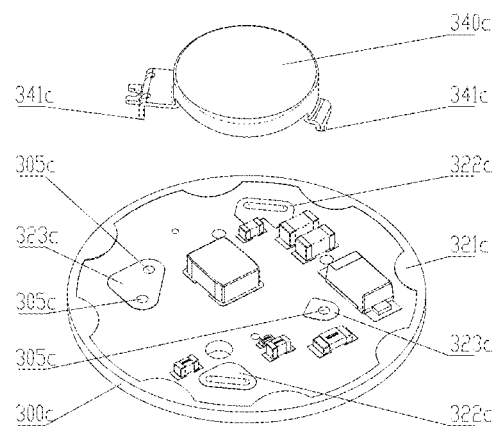
FIG. 36 is a schematic view showing that the inner electrode is welded to the circuit board of the controller of the rechargeable battery according to Embodiment 3.
Figure 37:
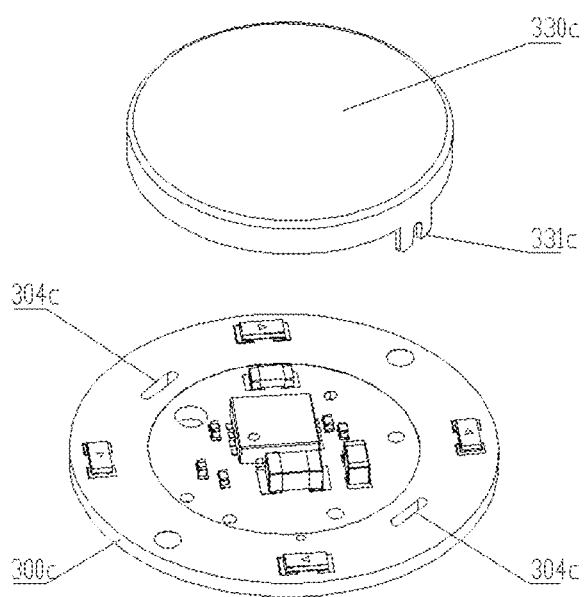
FIG. 37 is a schematic structural view showing that the negative-electrode end cover of the controller of the rechargeable battery is welded to the circuit board according to Embodiment 3.

As shown in FIGS. 36-37, similar to the circuit board structures in the above two embodiments, the second surface of the circuit board 300c of this embodiment is provided with first pads 321c (i.e., controller outer shell pads), second pads 322c (i.e., negative-electrode end-cover pads) and third pads 323c (i.e., inner-electrode pads). The first pads 321c are electrically connected to the common ground end of the charging and discharging control circuit and the positive electrode P of the charging input and discharging output of the charging and discharging control circuit, and the second pads 322c are electrically connected to the negative electrode N of the charging input and discharging output of the charging and discharging control circuit. The third pads 323c serve as access electrodes of the charging and discharging control circuit for connecting with the negative electrode 220c of the direct-sealed lithium-ion cell 200c.

As shown in FIG. 36, the inner electrode 340c is provided on the second surface of the circuit board 300c, and the inner electrode 340 includes an inner-electrode contact platform 342c parallel to the circuit board and inner-electrode welding positioning pins 341c connected to the inner-electrode contact platform 342c. The circuit board 300c is provided with inner-electrode positioning holes 305c penetrating the first surface and the second surface. The second surface of the circuit board 300c is provided with third pads 323c surrounding the inner-electrode positioning holes 305c, and the inner electrode 340c is positioned by inserting the inner-electrode welding positioning pins 341c into the inner-electrode positioning holes 305c, and the inner-electrode welding positioning pin 341c of the inner electrode are welded on the circuit board 300c through the third pads 323c to establish an electrical connection.

As shown in FIG. 37, the negative-electrode end cover 330c is made of metal conductive material, which is electrically connected to the circuit board 300c and arranged on the first surface of the circuit board 300c. The negative-electrode end cover 330c is provided with negative-electrode end-cover welding positioning pins 331c. The circuit board 300c is provided with positioning grooves 304c and the second pads 322c surrounding the positioning grooves 304c. The negative-electrode end cover 330c is positioned by inserting the negative-electrode end-cover welding positioning pins 331c into the positioning grooves 304c, and the negative-electrode end-cover welding positioning pins 331c are welded on the circuit board 300b through the second pads 322c to establish an electrical connection.

Figure 38:
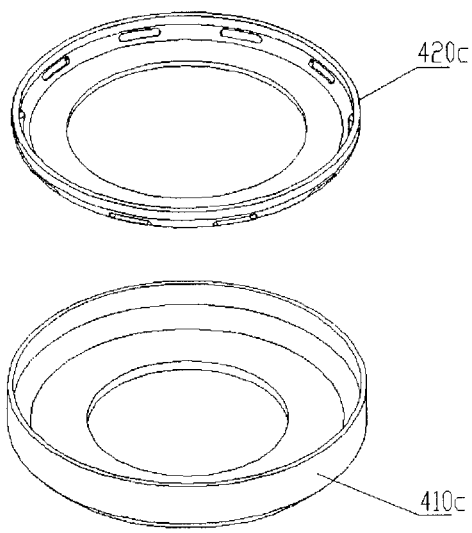
FIG. 38 is a schematic view showing that an outer shell assembly of the controller of the rechargeable battery is welded according to Embodiment 3.

As shown in FIGS. 36, 38 and 39, the controller outer shell assembly 430c includes a controller outer shell 410c and a circuit-board bracket 420c. The circuit-board bracket 420c is welded on the controller outer shell 410c, and forms a limiting boss to arrange the circuit board 300c in the controller outer shell 410c. The peripheral of the second surface of the circuit board 300c is provided with first pads 321c, and the circuit board is fixed to the circuit-board bracket 420c through the first pads 321c, and is welded to the controller outer shell 410c through the circuit-board bracket 420c to establish an electrical connection. A bottom of the controller outer shell 410c is provided with a through hole, and the inner-electrode contact platform 342c is exposed through the through hole, so as to be electrically connected to the negative electrode 220c of the direct-sealed lithium-ion cell 200c. There is a gap between an edge of the inner-electrode contact platform 342c and an edge of the through hole, to ensure that the inner electrode 340c and the controller outer shell 410c are insulated from each other.

As shown in FIGS. 39-40, further, an end surface of the controller 400c with the negative-electrode end cover 330c is further provided with a controller cover plate 460c and a cover-plate light shielding ring 490c. The controller cover plate 460c may be made of transparent or translucent light-conducting insulating material, and is configured to conduct the light emitted by the indicator lights inside the controller 400c. The cover-plate light shielding ring 490c covers the controller cover plate 460c, and is configured to shield the light emitted by the indicator lights in the controller 400c, so that the light is emitted from the side of the controller cover plate 460c.

The first pads 321c of the circuit board 300c are electrically connected to the common ground end GND of the charging and discharging control circuit. The first pads 321c of the circuit board 300c are welded to the circuit-board bracket 420c to establish an electrical connection. The bracket 420c of the circuit board is further welded on the controller outer shell 410c to establish an electrical connection, so that the controller outer shell 410c is electrically connected to the common ground end GND of the charging and discharging control circuit.

The second pads 322c of the circuit board 300c are electrically connected to the negative electrode N of the charging input and discharging output of the charging and discharging control circuit, and the negative-electrode end cover 330c is welded to the second pads 322c of the circuit board 300c to establish an electrical connection, so that the negative-electrode end cover 330c serves as the negative electrode N of the charging input and discharging output of the charging and discharging control circuit.

The third pads 323c of the circuit board 300c serve as access electrodes of the charging and discharging control circuit for connecting with the negative electrode 220c of the direct-sealed lithium-ion cell 200c, and the inner electrode 340c is welded to the third pads 323c of the circuit board 300c to establish an electrical connection, so that the inner electrode 340c serves as the access electrode of the charging and discharging control circuit for connecting with the negative electrode 220c of the direct-sealed lithium-ion cell 200c.

Therefore, the negative-electrode end cover 330c, the inner electrode 340c, and the controller outer shell 410c constitute the three structural electrodes of the controller 400c.

FIGS. 21-22 are diagrams showing the assembling relationship of the rechargeable battery 100c.

During assembling, the direct-sealed lithium-ion cell 200c is firstly inserted into the battery outer shell 110c in the direction of the positive electrode 210c facing the closed end of the battery outer shell 110c, and the positive electrode 210c of the direct-sealed lithium-ion cell 200c is welded to the closed end of the battery outer shell 110c. Then, an insulating layer 470c is pasted on a bottom surface of the battery outer shell 110c 400c facing the direct-sealed lithium-ion cell in an axial direction. The insulating layer 470c may be formed of a polyimide film with self-adhesive on one side, which is configured to establish an electrical insulation between the negative electrode 220c of the direct-sealed lithium-ion cell 200c and the controller outer shell 410c. The negative electrode 220c of the direct-sealed lithium-ion cell 200c is welded on the inner electrode 340c of the controller 400c, so that the negative electrode 220c of the direct-sealed lithium-ion cell 200c is welded on the inner electrode 340c to establish an electrical connection. The electrolyte is poured into a cavity of the battery outer shell 110c, in which the direct-sealed lithium-ion cell 200c is assembled, from the open end of the battery outer shell 110c. Finally, the controller 400c is aligned to be concentric with battery outer shell 110c, and the controller outer shell 410c and the battery outer shell 110c are welded together to establish an electrical connection.

After the rechargeable battery 100c is welded and assembled, the inner electrode 340c serves as the access electrode for connecting the negative electrode of the direct-sealed lithium-ion cell 200c with the controller 400c, and the negative-electrode end cover 330c serves as the negative electrode of the charging input and discharging output of the rechargeable battery 100c. The battery outer shell 110c serves as the positive electrode of the charging input and discharging output of the rechargeable battery 100c and the common ground end of the charging and discharging control circuit.

Embodiment 4: Rechargeable Battery with CID Cell

Figure 23A:
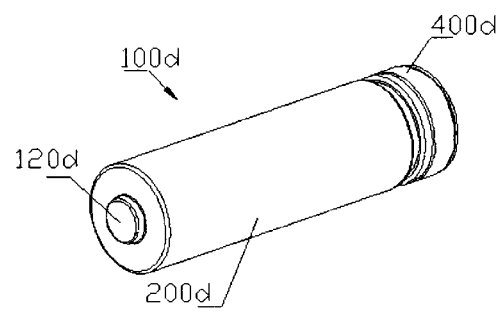
FIG. 23a is an outline schematic view of the rechargeable battery according to Embodiment 4.
Figure 23B:
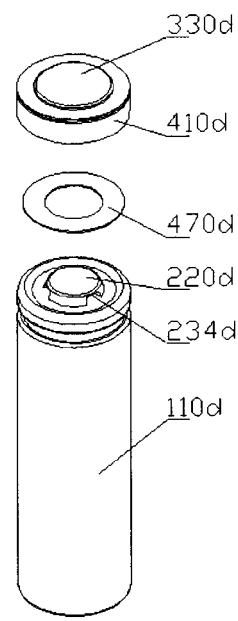
FIG. 23b is an exploded view of the rechargeable battery according to Embodiment 4.
Figure 23C:
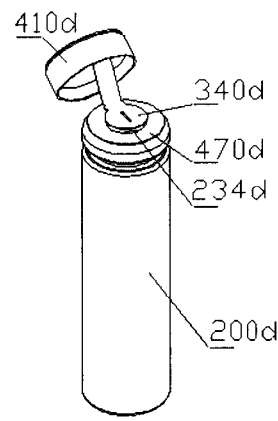
FIG. 23c is a schematic view showing that the negative electrode of the CID lithium-ion cell of the rechargeable battery is welded to the inner electrode of the controller according to Embodiment 4.

An outline structure of the rechargeable battery 100d is shown in FIG. 23a, and a structural assembly relationship of the rechargeable battery 100d is shown in FIGS. 23b-23c.

The rechargeable battery 100d includes a CID (Current Interrupt Device) lithium-ion cell 200d and a controller 400d.

As shown in FIGS. 23a-23c, the rechargeable battery 100d adopts a CID lithium-ion cell 200d. CID is short for Current Interrupt Device. When the CID lithium-ion cell 200d fails (such as overheating, short circuit and overcharge), a lot of gas is generated inside to increase pressure, and the pressure relief sheet inside the cell turns when the pressure increases, resulting in a short circuit inside the cell, thereby playing a role in protective effects.

The CID lithium-ion cell 200d may be filled with electrolyte, two ends of which are respectively provided with a negative electrode 220d and a positive electrode 120d. The outer wall of the CID lithium-ion cell 200d is the battery outer shell 110d, and the battery outer shell 110d and the positive electrode 120d of the CID lithium-ion cell are connected as a whole to establish an electrical connection. The negative electrode of the CID lithium-ion cell 200d is provided with pressure relief holes 234d of the cell, so that the gas generated by the CID lithium-ion cell 200d can be released through the pressure relief holes 234d of the cell.

The controller 400d is arranged at the negative electrode of the CID lithium-ion cell 200d. An internal structure of the controller 400d is substantially the same as a structure of the controller 400b of the rechargeable lithium-cover lithium-ion battery 100b described above. That is, a periphery of the controller 400d is provided with an controller outer shell 410d, and the controller 400d is provided with an inner electrode 340d at one end in the axial direction. The other end of the controller 400d is provided with a negative-electrode end cover 330d, and the controller 400d is provided with a circuit board (not shown in the figures). A charging and discharging control circuit is arranged on the circuit board, and the negative-electrode end cover 330d serves as the negative electrode N of the charging input and discharging output of the charging and discharging control circuit. The controller outer shell 410d is electrically connected to the common ground end GND of the charging and discharging control circuit, so that the inner electrode 340d serves as an access electrode of the charging and discharging control circuit for connecting with the negative electrode 220d of the CID lithium-ion cell 200d.

The inner electrode 340d of the controller 400d is welded to the negative electrode 220d of the CID lithium-ion cell 200d to establish an electrical connection, so that the inner electrode 340d constitutes the access electrode for connecting with the negative electrode of the lithium-ion cell.

An insulating layer 470d is arranged on a periphery of the negative electrode 220d of the CID lithium-ion cell 200d for establishing an electrical insulation between the controller outer shell 410d and the inner electrode 340d of the controller 400d.

One end of the battery outer shell 110d is welded on the controller outer shell 410d to establish an electrical connection. The positive electrode 120d of the CID lithium-ion cell 200d is electrically connected to the battery outer shell 110d, and the controller outer shell 410d is electrically connected to the common ground end GND of the charging and discharging control circuit. Thus, the battery outer shell 110d constitutes the positive electrode of the rechargeable battery 100d and the common ground end GND of the charging and discharging control circuit.

The negative-electrode end cover 330d serves as the negative electrode of the rechargeable battery 100d and the negative electrode N of the charging input and discharging output of the charging and discharging control circuit.

The CID lithium-ion cell 200d of this embodiment is provided with structures such as a current cut-off protection device and a pressure relief sheet, so it has a current cut-off protection function. In other embodiments, if the pressure relief protection function is not required, structures such as the current cut-off protection device, the pressure relief sheet, and the pressure relief holes 234d in the CID lithium-ion cell 200d of this embodiment can also be omitted.

The specific structure of the rechargeable battery is described in detail through four above specific embodiments. Although there are differences in the structure of the inner electrode, the structure of the controller outer shell, the structure of the lithium-ion cell, and a packaging structure of the lithium-ion cell and the controller in each embodiment, the circuit principles of the above four embodiments are the same.

The working principles of the above four embodiments of the rechargeable battery will be described in detail below with reference to FIGS. 24a-24b.

Figure 24A:
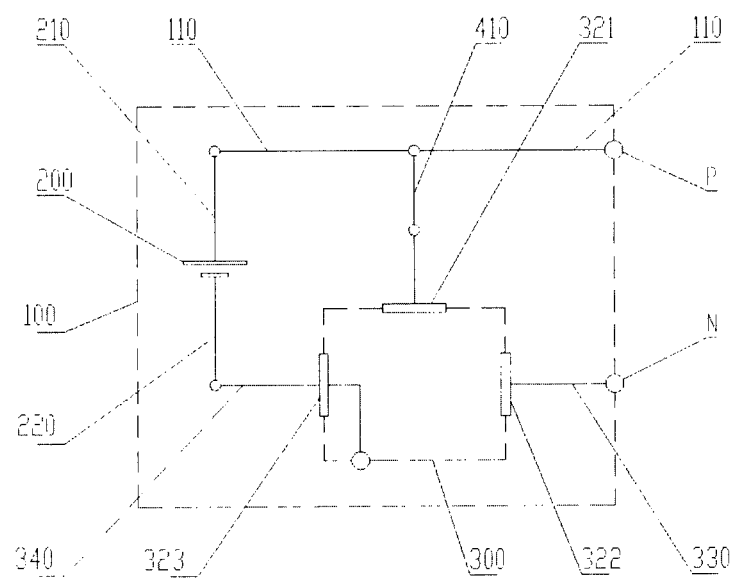
FIG. 24a is a schematic diagram of a circuit of the rechargeable battery.
Figure 24B:
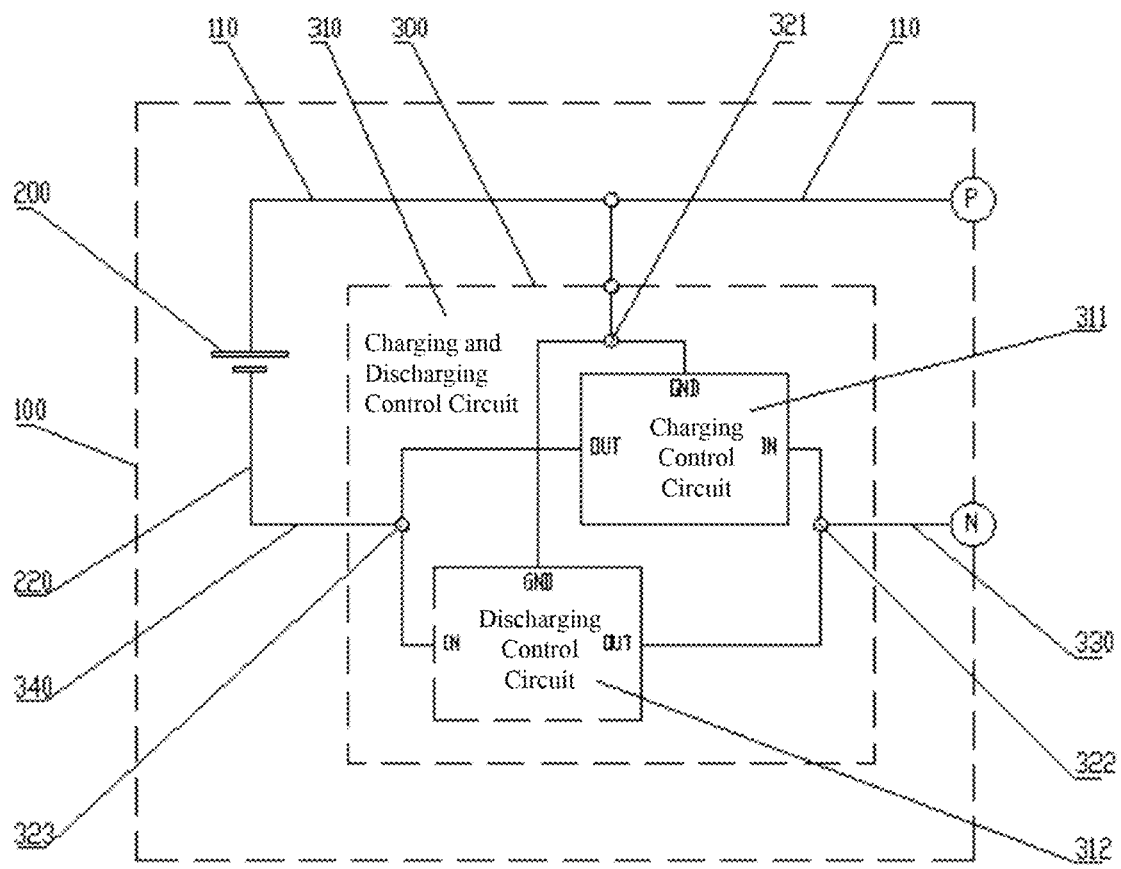
FIG. 24b is a schematic diagram of a charging and discharging of the rechargeable battery.

FIG. 24a is a schematic block diagram of the circuit of the rechargeable battery, and FIG. 24b is a schematic block diagram of the charging and discharging of the rechargeable battery.

The circuit of the rechargeable battery is as follows.

Referring to FIG. 24a, the positive electrode 210 of the lithium-ion cell 200 is electrically connected to the battery outer shell 110, and the battery outer shell 110 is electrically connected to the controller outer shell 410. The controller outer shell 410 is electrically connected to the circuit board 300 through the first pads provided on the circuit board 300, and is electrically connected to the common ground end GND of the charging and discharging control circuit on the circuit board 300 through the first pads 321. The battery outer shell 110 serves as the positive electrode P of the rechargeable battery 100 and the common ground end GND of the charging and discharging control circuit.

The negative-electrode end cover 330 of the controller 400 is electrically connected to the circuit board 300 through the second pads 322, and the second pads 322 are electrically connected to the charging input end and the discharging output end of the charging and discharging control circuit on the circuit board, so the negative-electrode end cover 330 serves as the negative electrode N of the rechargeable battery 100.

The inner electrode 340 of the controller 400 is electrically connected to the circuit board 300 through the third pads 323, and the inner electrode 340 is further electrically connected to the negative electrode 220 of the lithium-ion cell, so that the negative electrode 220 of the lithium-ion cell is connected to the charging and discharging control circuit of the circuit board 300 through the inner electrode 340.

Referring to FIG. 24b, a charging and discharging control circuit 310 is provided on the circuit board 300, which specifically includes two parts of circuits, i.e., a charging control circuit 311 and a discharging control circuit 312. A charging input end of the charging control circuit 311 is electrically connected to a discharging output end of the discharging control circuit 312. The charging input end of the charging control circuit 311 and the discharging output end of the discharging control circuit 312 are both electrically connected to the second pads 322, and are electrically connected to the negative-electrode end cover 330 through the second pads 322. The charging output end of the charging control circuit 311 is electrically connected to the discharging input end of the discharging control circuit 312. The charging output end of the charging control circuit 311 and the discharging input end of the discharging control circuit 312 are both electrically connected to the third pads 323, and are electrically connected to the negative electrode 220 of the lithium-ion cell 200 through the third pads 323. The common ground end GND of the charging control circuit 311 is electrically connected to the common ground end GND of the discharging control circuit 312. The common ground end GND of the charging control circuit 311 and the common ground end GND of the discharging control circuit 312 are both electrically connected to the first pads 321, and are electrically connected to the controller outer shell 410 and the battery outer shell 110 through the first pads 321.

When the discharging control circuit 312 detects that the external charging power source is not connected to the rechargeable battery or detects that the external charging power source is electrically disconnected from the rechargeable battery, the discharging control circuit 312 controls the rechargeable battery 100 to enter a discharging state.

In the discharging state, when an absolute value of a voltage of the lithium-ion cell 200 is higher than a set discharging cut-off voltage, the discharging control circuit 312 converts a negative-electrode discharging voltage of the lithium-ion cell 200 and converts the discharging voltage into a set negative-electrode discharging voltage, and the set discharging voltage is discharged externally through the negative electrode N of the rechargeable battery (i.e., the negative-electrode end cover 330), so that the rechargeable battery discharges externally. When the absolute value of the voltage of the lithium-ion cell 200 is equal to or lower than the set discharging cut-off voltage, the discharging control circuit 312 stops the rechargeable battery 100 charging outward by cutting off the connection of the discharging circuit and the negative electrode of the lithium-ion cell.

When the charging control circuit 311 detects that the external charging power supply is connected to the rechargeable battery, if a voltage of the external charging power supply meets a charging conditions, the charging control circuit 311 starts a charging for the lithium-ion cell. If the voltage of the external charging power supply does not meet the charging conditions, the charging control circuit 311 stops the lithium-ion battery from charging.

In a charging state, the charging control circuit 311 detects a voltage of the lithium-ion cell 200, and controls an input voltage and/or an input current of the negative electrode N (i.e., the end cover 330 of the negative electrode) of the rechargeable battery according to a voltage state of the lithium-ion cell and outputs the input voltage and/or the input current to the negative electrode of the lithium-ion cell, so as to charge the lithium-ion cell. After the lithium-ion cell is fully charged or the rechargeable battery is disconnected from the external charging power supply, the charging control circuit 311 is cut off, thereby stopping the charging of the lithium-ion cell.

A control method for charging the lithium-ion cell may be a trickle charging, a constant current charging, a constant voltage charging, or a combination of trickle current, constant current or constant voltage charging. For example, when the absolute value of the voltage of the lithium-ion cell is lower than the set discharging cut-off voltage, the lithium-ion cell is trickle-charged by controlling the charging current of the negative electrode of the lithium-ion cell. When the absolute value of the voltage of the lithium-ion cell is equal to or higher than the set discharging cut-off voltage but lower than a set charging upper limit voltage, the lithium-ion battery is charged with constant current by controlling the charging current of the negative electrode of the lithium-ion battery. When the absolute value of the voltage is equal to the set charging upper limit voltage, the lithium-ion cell is charged with constant voltage by controlling the charging voltage of the negative electrode of the lithium-ion battery. When a charging current of the lithium-ion cell under the constant-voltage charging is reduced to equal to or less than a set charging termination current, it is determined that the lithium-ion cell is fully charged, and the charging control circuit 311 stops the charging for the lithium-ion battery.

The discharging control circuit 312 may be a linear buck or boost control circuit, or a DC-DC buck or boost control circuit.

In order to facilitate the discharging control circuit 312 to convert the negative-electrode discharging voltage of the lithium-ion cell 200, the discharging control circuit 312 may be controlled by a negative level to convert the negative-electrode discharging voltage of the lithium-ion cell into a set discharging voltage and discharge externally.

The charging control circuit may be a linear buck or boost control circuit, or a DC-DC buck or boost control circuit.

In order to facilitate the charging control circuit 311 to control the input voltage and/or the input current of the negative electrode of the rechargeable battery and output the input voltage and/or the input current to the negative electrode of the lithium-ion cell, the charging control circuit 311 may be controlled by a negative level, and then the input voltage and/or input current of the negative electrode of the rechargeable battery can be controlled, so as to perform a trickle charging, a constant-current charging or a constant-voltage charging of the lithium-ion cell.

While specifically implementing the charging and discharging control circuit, main circuits of the charging control circuit and the discharging control circuit may be integrated in one chip, or may be integrated separately.

In other embodiments, the charging control circuit in the controller of the rechargeable battery may also be omitted, and the charging control circuit may be placed in the charging base matched with the rechargeable battery.

In other embodiments, the controller outer shell 410 may also be omitted, so that the control circuit assembly including the circuit board 300, the inner electrode 340 and the negative-electrode end cover 330 is directly accommodated into the battery outer shell 110, and the battery outer shell 110 is electrically connected to the common ground end of the circuit board 300.

In other embodiments, the inner electrode 340 may also be omitted, and the negative electrode 220 of the lithium-ion cell may be electrically connected to the circuit board 300 by wires or other methods, or the negative electrode 220 of the lithium-ion cell may be directly welded to the third pads 323 on the circuit board 300.

Discharging Control Method of Rechargeable Battery

The discharging control method of the rechargeable battery in this embodiment is applied to an electrical system of the rechargeable battery, which specifically includes the following steps.

A positive electrode of the lithium-ion cell is connected to the common ground end of a discharging control circuit, and the common ground end is taken as a positive electrode of a discharging output of the rechargeable battery.

A negative electrode of the lithium-ion cell is electrically connected to an input end of the discharging control circuit, and a discharging voltage is converted into a set negative-electrode discharging voltage by the discharging control circuit to discharge externally through an output electrode, and the output electrode is taken as a negative electrode of the discharging output of the rechargeable battery.

A specific implementation scheme of "the positive electrode of the lithium-ion cell is connected to the common ground end of a discharging control circuit" may be the same as the embodiments of the above four rechargeable batteries. The discharging control circuit is arranged in a controller, the controller outer shell is electrically connected to the common ground end of the discharging control circuit, and is electrically connected to the positive electrode of the lithium-ion cell and the battery outer shell. Thus the positive electrode of the lithium-ion cell is electrically connected to the common ground end of the discharging control circuit. The specific implementation scheme in the above-mentioned four embodiments of the rechargeable battery may also be omitted, for example, the controller outer shell is omitted, and the battery outer shell is directly and electrically connected to the common ground end of the discharging control circuit, and the battery outer shell is electrically connected to the positive electrode of the lithium-ion cell.

A specific implementation scheme of "the negative electrode of the lithium-ion cell is electrically connected to the input end of the discharging control circuit" may be the same as the above-mentioned four embodiments of the rechargeable battery. The discharging control circuit is arranged in a controller, and an inner electrode is arranged inside the controller, so that the inner electrode is electrically connected to the input end of the discharging control circuit, and the negative electrode of the lithium-ion cell is welded to the inner electrode to establish an electrical connection with the input end of the discharging control circuit. The specific implementation scheme in the above-mentioned four rechargeable battery embodiments may also not be adopted, for example, the inner electrode is omitted, and the negative electrode of the lithium-ion cell is directly and electrically connected to the input end of the discharging control circuit in the controller through a wire or other conductive structure, or the negative electrode of the lithium-ion cell is directly welded on the circuit board.

Specifically, the discharging control method includes the following steps.

When the discharging control circuit detects that an external charging power supply is not connected to the rechargeable battery or detects that the external charging power source is disconnected from the rechargeable battery, the discharging control circuit controls the rechargeable battery to enter a discharging state.

In the discharging state of the rechargeable battery, when an absolute value of a voltage of the lithium-ion cell is higher than the set discharging cut-off voltage, the discharging control circuit converts the negative-electrode discharging voltage of the lithium-ion cell to a set negative-electrode discharging voltage, and then discharge externally.

In the discharging state of the rechargeable battery, when the absolute value of the voltage of the lithium-ion cell is equal to or lower than the discharging cut-off voltage, the discharging control circuit cuts off the connection of the discharging circuit and the negative electrode of the lithium-ion cell, to stop the rechargeable battery from discharging outward.

When the charging and discharging control circuit detects that the external charging power supply is not connected or detects that the external charging power supply is disconnected, the charging and discharging control circuit turns on the discharging control circuit, and the negative-electrode discharging voltage of the lithium-ion cell is converted into the set negative-electrode discharging voltage, so as to discharge outward. When the absolute value of the voltage of the lithium-ion cell is equal to or lower than the discharging cut-off voltage, the discharging control circuit cuts off the connection of the discharging circuit and the lithium-ion cell, to stop discharging.

Charging Control Method of Rechargeable Battery

A charging control method of a rechargeable battery in this embodiment is applied to an electrical system of the rechargeable battery itself or an external electrical system independent of an rechargeable battery (e.g., an electrical system of a charging stand matched with the rechargeable battery). The charging control method specifically includes the following steps.

A positive electrode of a charging input of the rechargeable battery is electrically connected to a common ground end of the charging control circuit, and the common ground end is taken as the positive electrode of the charging input of the rechargeable battery.

A negative electrode of the charging input of the rechargeable battery is taken as an input end of the charging control circuit, so that the charging control circuit controls the input voltage and/or input current of the negative electrode and outputs the input voltage and/or the input current to the negative electrode of the lithium-ion cell, to charge the lithium-ion cell.

A specific implementation scheme of "the positive electrode of the charging input of the rechargeable battery is electrically connected to the common ground end of the charging control circuit" may be the same as the above four embodiments of the rechargeable battery. The positive electrode of the lithium-ion cell is taken as the positive electrode of the charging input of the rechargeable battery, and the charging control circuit is arranged in a controller. The controller outer shell is electrically connected to the common ground end of the charging control circuit, and is electrically connected to the positive electrode of the lithium-ion cell and the battery outer shell. Thus the positive electrode of the lithium-ion cell is electrically connected to the common ground end of the charging control circuit. The specific implementation scheme in the above-mentioned four embodiments of the rechargeable battery may not be adopted, for example, the controller outer shell is omitted, and the battery outer shell is directly and electrically connected to the common ground end of the charging control circuit, and electrically connected to the positive electrode of the lithium-ion cell.

A specific control method of "the charging control circuit controls the input voltage and/or input current of the negative electrode" includes the following steps.

When an absolute value of a voltage of the lithium-ion cell is lower than a set discharging cut-off voltage, the lithium-ion cell is trickle-charged by controlling a charging current of the negative electrode of the lithium-ion cell.

When the absolute value of the voltage of the lithium-ion cell is equal to or higher than the set discharging cut-off voltage but lower than a set upper limit charging voltage, the lithium-ion cell is charged with constant current by controlling the charging current of the negative electrode of the lithium-ion cell.

When the absolute value of the voltage of the lithium-ion cell is equal to the set upper limit charging voltage, the lithium-ion cell is charged with constant voltage by controlling the charging voltage of the negative electrode of the lithium-ion cell.

When the charging current of the lithium-ion cell during the constant-voltage charging is reduced to be equal to or less than a set charging termination current, it is determined that the lithium-ion cell is fully charged, and the charging control circuit stops the charging for the lithium-ion cell.

In other embodiments, one or two of trickle charging, constant-current charging and constant-voltage charging are selected.

Further, in the above charging control method, before the rechargeable battery enters the charging state, the external charging power supply is further required to be detected.

When the charging control circuit detects that the external charging power supply is connected to the rechargeable battery, the charging control circuit controls the rechargeable battery to enter the charging state. When the rechargeable battery is in the charging state, the charging control circuit detects the voltage of the lithium-ion battery and controls the input voltage and/or input current of the negative electrode of the lithium-ion battery according to a voltage state of the lithium-ion cell, so as to perform a charging control of the lithium-ion cell.

When the charging control circuit detects that the lithium-ion battery is fully charged or the rechargeable battery is disconnected from the external charging power supply, cuts off the charging for the lithium-ion battery.

Further, in the above charging control method, before the rechargeable battery enters the charging state, it is required to perform a charging condition detection.

When the external charging power supply is connected to the rechargeable battery, the charging control circuit detects the voltage of the external charging power supply. When the voltage of the external charging power supply meets the charging conditions, the charging control circuit starts the charging for the lithium-ion battery.

When the voltage of the external charging power supply does not meet the charging conditions, the charging control circuit stops the charging for the lithium-ion cell.

Although the present disclosure has been described with reference to several exemplary embodiments, it should be understood that the terms are used for description and illustration, and not for limitation. Since the present application can be embodied in many forms without departing from the spirit or essence of the invention, it should be understood that the above-mentioned embodiments are not limited to any of the foregoing details, but are to be construed broadly within the spirit and scope defined by the appended claims. Therefore, all changes and modifications that come within the scope of the claims or their equivalents should be covered by the appended claims.

What is claimed is:

1. A discharging control method of a rechargeable battery, applied to an electrical system of the rechargeable battery, wherein the electrical system comprises a lithium-ion cell and a discharging control circuit, and the discharging control method comprises:
    electrically connecting a positive electrode of the lithium-ion cell to a common ground end of the discharging control circuit, and taking the common ground end as a positive electrode of a discharging output of the rechargeable battery; and
    electrically connecting a negative electrode of the lithium-ion cell to an input end of the discharging control circuit, converting a negative-electrode discharging voltage of the lithium-ion cell to a set negative-electrode discharging voltage by the discharging control circuit, and discharging outward through an output electrode, wherein the output electrode is taken as a negative electrode of the discharging output of the rechargeable battery.

2. The discharging control method of the rechargeable battery of claim 1,
    wherein the discharging control circuit controls the rechargeable battery to enter a discharging state, when the discharging control circuit detects that an external charging power supply is not connected to the rechargeable battery or the external charging power supply is disconnected from the rechargeable battery;
    wherein the discharging control circuit converts the negative-electrode discharging voltage of the lithium-ion cell to the set negative-electrode discharging voltage to discharge outward, when an absolute value of a voltage of the lithium-ion cell is higher than a set discharging cut-off voltage in the discharging state of the rechargeable battery; and
    wherein the discharging control circuit cuts off a connection of a discharging circuit and the negative electrode of the lithium-ion cell, to stop the rechargeable battery from discharging outward, when the absolute value of the voltage of the lithium-ion cell is equal to or lower than the set discharging cut-off voltage in the discharging state of the rechargeable battery.

3. A charging control method of a rechargeable battery, applied to the rechargeable battery itself or an external electrical system independent of the rechargeable battery, wherein the electrical system comprises a charging control circuit, and the rechargeable battery comprises a lithium-ion cell, and the charging control method comprises:
    electrically connecting a positive electrode of a charging input of the rechargeable battery to a common ground end of the charging control circuit, and taking the common ground end as the positive electrode of the charging input of the rechargeable battery; and
    electrically connecting a negative electrode of the charging input of the rechargeable battery to an input end of the charging control circuit, so that the charging control circuit controls an input voltage and/or an input current of a negative electrode of the rechargeable battery, and outputs the input voltage and/or the input current to the negative electrode of the lithium-ion cell, to charge the lithium-ion cell.

4. The charging control method of the rechargeable battery of claim 3,
    wherein the charging control circuit controls the rechargeable battery to enter a charging state, when the charging control circuit detects that an external charging power supply is connected to the rechargeable battery; and
    wherein the charging control circuit detects a voltage of the lithium-ion cell and controls the input voltage and/or the input current of the negative electrode of the lithium-ion cell according to a voltage state of the lithium-ion cell, to control a charging for the lithium-ion cell, when the rechargeable battery is in the charging state;

wherein the charging control circuit stops the charging for the lithium-ion cell, after the lithium-ion cell is fully charged or the rechargeable battery is disconnected from the external charging power supply.

5. The charging control method of a rechargeable battery of claim 3, wherein the charging control circuit detects a voltage of an external charging power supply, when the external charging power supply is connected to the rechargeable battery; and wherein the charging control circuit starts a charging for the lithium-ion cell, when the voltage of the external charging power supply meets charging conditions;

wherein the charging control circuit stops the charging for the lithium-ion cell, when the voltage of the external charging power supply does not meet charging conditions.

6. A rechargeable battery, comprising: a lithium-ion cell and a controller arranged at one end of the lithium-ion cell where a negative electrode is located, wherein the controller comprises a circuit board, on which a discharging control circuit and a negative-electrode end cover are arranged;

wherein a common ground end of the discharging control circuit is electrically connected to a positive electrode of the lithium-ion cell;

wherein the negative-electrode end cover is welded on the circuit board, and is electrically connected to a discharging output end of the discharging control circuit by welding;

wherein the discharging control circuit is provided with a discharging input end, and the negative electrode of the lithium-ion cell is welded and electrically connected to the discharging input end; and wherein a positive electrode of the lithium-ion cell is taken as a positive electrode of the rechargeable battery, and the negative-electrode end cover is taken as a negative electrode of the rechargeable battery.

7. The rechargeable battery of claim 6, wherein an inner electrode is further welded on the circuit board, and the negative-electrode end cover and the inner electrode are respectively arranged on a first surface of the circuit board and a second surface of the circuit board opposite to the first surface of the circuit board, and wherein the inner electrode is electrically connected to the discharging input end of the discharging control circuit by welding, so that the inner electrode becomes an access electrode for connecting the negative electrode of the lithium-ion cell with the controller.

8. The rechargeable battery of claim 7, wherein a periphery of the controller is provided with a controller outer shell, and the circuit board is arranged in the controller outer shell, and wherein the controller outer shell is electrically connected to the common ground end of the discharging control circuit by welding.

9. The rechargeable battery of claim 8, wherein an outer wall of the lithium-ion cell is provided with a battery outer shell made of conductive material, and the battery outer shell is electrically connected to the positive electrode of the lithium-ion cell; and wherein an end of the battery outer shell is electrically connected to the controller outer shell by welding, so that the battery outer shell is electrically connected to the positive electrode of the lithium-ion cell, the controller outer shell and the common ground end of the discharging control circuit.

10. The rechargeable battery of claim 8, wherein the lithium-ion cell is arranged in a battery outer shell made of conductive material, and the battery outer shell has a structure with an open end and a closed end, wherein a positive electrode cap is provided at the closed end, and the battery outer shell is electrically connected to the positive electrode of the lithium-ion cell; and wherein the open end of the battery outer shell is provided with a cell cap shell, and the controller outer shell is welded and electrically connected to the battery outer shell through the cell cap shell.

11. The rechargeable battery of claim 8, wherein the lithium-ion cell is arranged in a battery outer shell made of conductive material, and the battery outer shell is a structure with an open end and a closed end, wherein a positive electrode cap is provided at the closed end, and the battery outer shell is electrically connected to the positive electrode of the lithium-ion cell; and wherein the controller is arranged at the open end of the battery outer shell, and the controller outer shell is welded and electrically connected to the battery outer shell.

12. The rechargeable battery of claim 11, wherein the positive electrode of the lithium-ion cell is bent toward the negative electrode and extends to the open end of the battery outer shell, and is welded to the battery outer shell at the open end to establish an electrical connection, and wherein the negative electrode of the lithium-ion cell is electrically connected to the inner electrode.

13. The rechargeable battery of claim 8, wherein the controller outer shell comprises a cylindrical side wall and a bottom wall formed at an end of the side wall in an axial direction and perpendicular to the side wall, and the circuit board is arranged in a cavity enclosed by the side wall.

14. The rechargeable battery of claim 13, wherein an inner surface of the side wall is protrudingly provided with a limiting boss made of conductive metal material, which is an annular platform protrudingly formed on the inner surface of the side wall, wherein the annular platform is provided with an annular support plane protruding from the inner surface of the side wall for supporting the circuit board, and the support plane and the side wall form an annular inner positioning groove with an L-shaped axial section;

wherein a plurality of first pads are arranged around an edge of the circuit board, the first surface of the circuit board is flush with an end surface of an open end of the control outer shell when the circuit board is rested across the limiting boss, and the second surface of the circuit board and the limiting boss are contacted and welded through the first pads, so as to establish an electrical connection with the controller outer shell, and wherein the first pads are electrically connected to the common ground end of the discharging control circuit.

15. The rechargeable battery of claim 8, wherein the controller outer shell is provided with an inner cavity, the circuit board is accommodated in the inner cavity, and the controller outer shell is electrically connected to the circuit board, wherein the first surface of the circuit board faces a top of the controller outer shell, and the negative-electrode end cover protrudes from a top opening of the controller outer shell, wherein the second surface of the circuit board faces a bottom of the controller outer shell, a through hole is provided at the bottom of the controller outer shell, and the inner electrode is exposed through the through hole.

16. The rechargeable battery of claim 15, wherein the inner electrode comprises a inner-electrode contact platform parallel to the circuit board and inner-electrode welding positioning pins connected to the inner-electrode contact platform, wherein the inner-electrode welding positioning pins are fixed on the circuit board and are electrically connected to the circuit board, wherein the circuit board is provided with inner-electrode positioning holes penetrating the first surface and the second surface, wherein third pads are arranged surrounding the inner-electrode positioning holes on the second surface, the inner electrode is positioned by inserting the inner-electrode welding positioning pins into the inner-electrode positioning holes, and the inner-electrode welding positioning pins are welded to the circuit board through the third pads to establish an electrical connection, so that the inner electrode is welded to the third pads of the circuit board to establish an electrical connection, and the inner-electrode contact platform is exposed through the through hole, so as to be electrically connected to the negative electrode of the lithium-ion cell, and wherein there is a gap between an edge of the inner-electrode contact platform and an edge of the through hole.

17. The rechargeable battery of claim 16, wherein the inner-electrode welding positioning pins and the inner-electrode contact platform form a strip structure, the inner-electrode contact platform and the inner-electrode welding positioning pins are integrally formed, and the inner-electrode contact platform is capable of being elastically bent relative to the inner-electrode welding positioning pins.

18. The rechargeable battery of claim 8, wherein the negative-electrode end cover is made of metal conductive material, which is electrically connected to the circuit board and is arranged on the first surface of the circuit board, wherein the negative-electrode end cover includes a circular hollow cap body with an open end and negative-electrode end-cover welding positioning pins formed by integrally extending the cap body, wherein the circuit board is provided with positioning grooves penetrating the first surface and the second surface, the second surface of the circuit board is provided with second pads surrounding the positioning grooves, the negative-electrode end cover is positioned by inserting the negative-electrode end-cover welding positioning pins into the positioning grooves, and the negative-electrode end-cover welding positioning pins are welded to the circuit board through the second pads to establish an electrical connection, and wherein the second pads are electrically connected to a negative electrode of a discharging output of the discharging control circuit.

19. The rechargeable battery of claim 8, wherein the controller further comprises a controller cover plate surrounding a periphery of the negative-electrode end cover and covering the first surface of the circuit board, and wherein the controller cover plate is made of insulating material.

20. The rechargeable battery of claim 6, wherein a charging control circuit is further arranged on the circuit board;
   wherein a common ground end of the charging control circuit is electrically connected to the common ground end of the discharging control circuit;
   wherein a charging input end of the charging control circuit is electrically connected to a discharging output end of the discharging control circuit, and further electrically connected to the negative-electrode end cover; and
   wherein a charging output end of the charging control circuit is electrically connected to a discharging input end of the discharging control circuit, and is further electrically connected to the negative electrode of the lithium-ion cell.

* * * * *